United States Patent
Takahashi et al.

(10) Patent No.: US 7,144,962 B2
(45) Date of Patent: Dec. 5, 2006

(54) METHOD FOR SURFACE TREATMENT OF RUBBER PROCESS FOR PRODUCTION OF RUBBER ARTICLES, RUBBER COMPOSITIONS, RUBBER MOLDING, AND PROCESS FOR PRODUCTION THEREOF

(75) Inventors: Hidetaka Takahashi, Saitama (JP); Hideo Sawada, Shiki-gun (JP)

(73) Assignee: Fujikura Rubber Ltd., Tokyo (JP)

(*) Notice: Subject to any disclaimer, the term of this patent is extended or adjusted under 35 U.S.C. 154(b) by 304 days.

(21) Appl. No.: 10/477,785

(22) PCT Filed: Aug. 8, 2002

(86) PCT No.: PCT/JP02/08116

§ 371 (c)(1),
(2), (4) Date: Nov. 13, 2003

(87) PCT Pub. No.: WO03/016385

PCT Pub. Date: Feb. 27, 2003

(65) Prior Publication Data

US 2004/0157063 A1  Aug. 12, 2004

(30) Foreign Application Priority Data

Aug. 21, 2001 (JP) ............................. 2001-249917
Dec. 4, 2001 (JP) ............................. 2001-369468

(51) Int. Cl.
*C08C 19/18* (2006.01)
*C08C 19/25* (2006.01)

(52) U.S. Cl. ............................. 525/332.3; 525/326.1; 525/332.5; 525/333.1; 525/333.2; 525/342; 525/359.3; 528/491

(58) Field of Classification Search ............ 525/332.3, 525/326.1, 332.5, 333.1, 333.2, 342, 359.3; 528/491
See application file for complete search history.

(56) References Cited

U.S. PATENT DOCUMENTS 5,372,851 A    12/1994   Ogawa et al.

FOREIGN PATENT DOCUMENTS

| EP | 0 487 094 B1 | 5/1992 |
|----|--------------|--------|
| EP | 0 547 550 A1 | 6/1993 |
| JP | 3-228853 A | 10/1991 |
| JP | 5-25457 | * 2/1993 |
| JP | 5-25457 A | 2/1993 |
| JP | 5-132873 A | 5/1993 |
| JP | 5-161844 A | 6/1993 |
| JP | 5-186761 A | 7/1993 |
| JP | 6-256360 | 9/1994 |
| JP | 7-149512 A | 6/1995 |
| JP | 10-245419 A | 9/1998 |
| JP | 11-217507 | 8/1999 |
| JP | 11-246573 A | 9/1999 |
| JP | 11-246782 A | 9/1999 |
| JP | 2000-248114 A | 9/2000 |
| JP | 2001-123117 A | 5/2001 |

OTHER PUBLICATIONS

English-language International Preliminary Examination Report dated Oct. 23, 2003 International Application No. PCT/JP02/08116 filed Aug. 8, 2002; Applicants: Fujikura Rubber LTD.

* cited by examiner

*Primary Examiner*—Roberto Rabago
(74) *Attorney, Agent, or Firm*—Frishauf, Holtz, Goodman & Chick, P.C.

(57) ABSTRACT

A method for the surface treatment of rubber, a process for production of a rubber article, and a rubber composition wherein a structure derived from a fluorine compound containing a fluoroalkyl at both ends of its molecule are joined to a polymer main chain of crosslinked rubber in the vicinity of the surface of a rubber base (molding). The method involves causing the fluorine compound and a silane coupling agent to exist in the vicinity of the surface of a rubber base, and heat-treating the rubber base. The production process comprises compounding and mixing raw rubber and a silane coupling agent to obtaining a molding of crosslinked rubber and heating the molding. The rubber composition contains raw rubber, a crosslinking agent, the fluorine compound and a silane coupling agent.

42 Claims, No Drawings

US 7,144,962 B2

METHOD FOR SURFACE TREATMENT OF RUBBER PROCESS FOR PRODUCTION OF RUBBER ARTICLES, RUBBER COMPOSITIONS, RUBBER MOLDING, AND PROCESS FOR PRODUCTION THEREOF

This application is the United States national phase application of International Application PCT/JP02/08116 filed Aug. 8, 2002.

TECHNICAL FIELD

The present invention relates to a method for surface treatment of rubber, and particularly to a method for surface treatment of rubber, by which a structure derived from a fluorine compound having groups containing a fluoroalkyl group at both ends of its molecule can be surely and efficiently joined to a polymer main chain of crosslinked rubber in the vicinity of the surface of a rubber base.

The present invention also relates to a process for production of rubber articles, and particularly to a process for producing rubber articles, in which a structure derived from a fluorine compound having groups containing a fluoroalkyl group at both ends of its molecule is surely joined to a polymer main chain of crosslinked rubber in the vicinity of the surfaces of moldings.

The present invention further relates to rubber compositions, and rubber moldings and a process for production thereof, and particularly to novel rubber compositions comprising a fluorine compound having groups containing a fluoroalkyl group at both ends of its molecule as an ingredient, rubber moldings, in which a structure derived from the fluorine compound is joined to a polymer main chain of crosslinked rubber, and a process for producing such rubber moldings with good results.

BACKGROUND ART

[Prior Art]

It has heretofore been known methods to treat the surface of a resin with a fluorine compound (oligomer) having fluoroalkyl groups at both ends of its molecule and a functional group joined to an intermediate chain thereof. Since the fluoroalkyl groups at both ends of the fluorine compound used in the surface treatment of the resin are joined to the intermediate chain through a covalent bond, the expected effects by the surface treatment, such as imparting of tack-free property, surface lubricity, water and oil repellency, anti-staining property, antibacterial property and physiological activity, can be exhibited over a long period of time.

As processes (production processes of a surface-treated resin article) for surface treatment of a resin with such a fluorine compound, the following processes (1) and (2) have been introduced.

(1) A process comprising dissolving the fluorine compound together with the resin in an organic solvent and then removing the organic solvent (Japanese Patent Application Laid-Open No. 246573/1999).

(2) A process comprising dissolving the fluorine compound in a photo-polymerizable monomer to prepare a photo-curable composition, coating the surface of the resin (plastic) with the composition and photo-curing a coating film formed (Japanese Patent Application Laid-Open No. 245419/1998).

[Problems to be Solved by the Invention]

It is thus desirable that such a fluorine compound can be applied to rubber articles; that is to say, the fluorine compound can be used to treat the surface of rubber (produce a surface-treated rubber article).

However, the above-described processes (1) and (2) are suitable for use as a treatment process (production process of a resin article) of "resin", whereas any rubber article good in surface properties such as water and oil repellency and anti-staining property cannot be provided even when "rubber" is treated in accordance with these processes.

The present inventors have therefore attempted the following processes (3) to (5).

(3) A process comprising immersing a molding (rubber base) composed of uncrosslinked rubber in a solution of such a fluorine compound, drying the molding and then subjecting the molding to a heat treatment, thereby crosslinking the rubber and at the same time, forming a coating film (surface-treating layer) on the surface of the molding.

(4) A process comprising immersing a molding (rubber base) composed of crosslinked rubber in a solution of the fluorine compound, drying the molding and then subjecting the molding to a heat treatment, thereby forming a coating film (surface-treating layer) on the surface of the molding.

(5) A process comprising compounding and mixing the fluorine compound together with a crosslinking agent with uncrosslinked rubber to prepare a rubber composition and subjecting the rubber composition to molding.

In the processes (3) and (4), however, adhesion force of the coating film (surface-treating layer) formed to the molding (rubber base) is small, and so the coating film is easy to be separated. The processed are thus not practical. In addition, since the fluorine compound forming the coating film is easy to be dissolved in various solvents, the coating film is eroded by or dissolved in a solvent, when the solvent is brought into contact with the rubber article obtained by the process (3) or (4), so that the coating film is removed from the surface of the molding.

On the other hand, the fluorine compound separates out (blooms or bleeds) on the surface of the rubber molding obtained by the process (5), and so the fluorine atom derived from this compound has been able to be unevenly distributed (maldistribute) in the vicinity of the surface of the rubber molding.

When a solvent is brought into contact with the rubber molding obtained in the above-described manner, however, the fluorine compound separated out on the surface thereof is dissolved in the solvent, and the fluorine compound is run out from the surface. As a result, there arises a problem that the surface properties (for example, water and oil repellency and physiological activity) imparted to the molding by the fluorine compound are destroyed or extinguished.

DISCLOSURE OF THE INVENTION

The present invention has been made on the basis of the foregoing circumstances.

It is the first object of the present invention to provide a method for surface treatment of rubber, by which a structure derived from a fluorine compound having groups containing a fluoroalkyl group at both ends of its molecule and a functional group joined to an intermediate chain thereof can be surely and efficiently joined to a polymer main chain of crosslinked rubber in the vicinity of the surface of a rubber base, and the surface-treated effect by the fluorine compound can be stably exhibited without being extinguished or destroyed even when brought into contact with various solvents.

The second object of the present invention is to provide a process for production of a rubber article, by which a structure derived from a fluorine compound having groups containing a fluoroalkyl group at both ends of its molecule and a functional group joined to an intermediate chain thereof can be surely and efficiently joined to a polymer main chain of crosslinked rubber in the vicinity of the surface of a molding (rubber base), and rubber articles that can stably exhibit the surface-treated effect by the fluorine compound without being extinguished or destroyed even when brought into contact with various solvents can be produced.

The third object of the present invention is to provide a novel rubber composition that contains a fluorine compound having groups containing a fluoroalkyl group at both ends of its molecule and a functional group joined to an intermediate chain thereof and can impart stable surface properties free from being extinguished or destroyed even when brought into contact with various solvents to moldings of crosslinked rubber obtained by molding and processing such a rubber composition.

The fourth object of the present invention is to provide a rubber molding that can exhibit stable surface properties free from being extinguished or destroyed even when brought into contact with various solvents as a result that the structure derived from the fluorine compound is surely and efficiently joined to a polymer main chain of crosslinked rubber in the vicinity of at least the surface of the molding, and a production process thereof.

[Means for Solving the Problems]

A first method for surface treatment of rubber according to the present invention comprises the steps of causing a fluorine compound (hereinafter also referred to as "specific fluorine compound") represented by the following general formula (I) and a silane coupling agent to exist in the vicinity of the surface of a rubber base composed of uncrosslinked rubber; and heat-treating the rubber base.

General Formula (I):

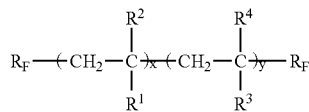

wherein $R_F$ is a group containing a fluoroalkyl group, $R^1$ is a functional group having reactivity to a hydrolyzable group, $R^2$ is a hydrogen atom or alkyl group, $R^3$ and $R^4$ are the same or different from each other and are individually a hydrogen atom or monovalent organic group, x is an integer of 1 to 100, and y is an integer of 0 to 500.

The rubber base (uncrosslinked rubber), in which the specific fluorine compound and silane coupling agent exist in the vicinity of the surface thereof, is heat-treated, whereby rubber forming the rubber base is crosslinked, and moreover a structure derived from the specific fluorine compound can be joined to a polymer main chain of the rubber through the silane coupling agent.

In other words, in the vicinity of the surface of the rubber base to be heat-treated, (i) crosslinking reaction of the rubber, (ii) reaction of the functional group ($R^1$) of the specific fluorine compound with a hydrolyzable group of the silane coupling agent, and (iii) reaction of a reactive organic functional group of the silane coupling agent with the polymer main chain of the rubber take place.

Since chemical bonds are formed between the structure derived from the specific fluorine compound and the silane coupling agent and between the silane coupling agent and the polymer main chain of the rubber as described above, the structure (surface-treating layer) derived from the specific fluorine compound comes to strongly adhere to the rubber base.

Further, since the hybrid formed by the reaction of the functional group of the specific fluorine compound with the hydrolyzable group of the silane coupling agent is excellent in heat stability and chemical stability and becomes insoluble or hardly soluble even in various solvents that are good solvents for the specific fluorine compound, the surface-treated effect by the specific fluorine compound can be stably exhibited without being extinguished or destroyed even when brought into contact with various solvents, so that the chemical resistance (oil resistance-solvent resistance) of the rubber can be markedly improved.

In the first method for surface treatment of rubber according to the present invention, the following embodiments are preferred.

(a) A solution of the silane coupling agent is coated on the surface of the rubber base composed of the uncrosslinked rubber, thereby causing the silane coupling agent to exist (adhere) in the vicinity of the surface of the rubber base, and a solution of the specific fluorine compound is coated on the surface of the rubber base, thereby causing the specific fluorine compound to exist (adhere) in the vicinity of the surface of the rubber base.

(b) A mixed solution of the specific fluorine compound and the silane coupling agent is coated on the surface of the rubber base composed of the uncrosslinked rubber, thereby causing the specific fluorine compound and the silane coupling agent to exist (adhere) in the vicinity of the surface of the rubber base.

(c) The rubber base composed of the uncrosslinked rubber is immersed in a solution of the silane coupling agent, thereby causing the silane coupling agent to exist (adhere) in the vicinity of the surface of the rubber base, and the rubber base is immersed in a solution of the specific fluorine compound, thereby causing the specific fluorine compound to exist (adhere) in the vicinity of the surface of the rubber base.

(d) The rubber base composed of the uncrosslinked rubber is immersed in a mixed solution of the specific fluorine compound and the silane coupling agent, thereby causing the specific fluorine compound and the silane coupling agent to exist (adhere) in the vicinity of the surface of the rubber base.

(e) The silane coupling agent is compounded into and mixed with rubber, thereby causing the silane coupling agent to exist in the vicinity of at least the surface of the rubber base composed of the uncrosslinked rubber, and a solution of the specific fluorine compound is coated on the surface of the rubber base, thereby causing the specific fluorine compound to exist (adhere) in the vicinity of the surface of the rubber base.

(f) The silane coupling agent is compounded into and mixed with rubber, thereby causing the silane coupling agent to exist in the vicinity of at least the surface of the rubber base composed of the uncrosslinked rubber, and the rubber base is immersed in a solution of the specific fluorine compound, thereby causing the specific fluorine compound to exist (adhere) in the vicinity of the surface of the rubber base.

(g) In the general formula (I) representing the specific fluorine compound, the functional group represented by $R^1$ is an alkoxysilyl group or alkoxyalkoxysilyl group.

(h) In the general formula (I) representing the specific fluorine compound, the functional group represented by $R^1$ is a trimethoxysilyl group.

(i) In the general formula (I) representing the specific fluorine compound, the fluoroalkyl group-containing group represented by $R_F$ is represented by —$CF_3$, —$C_2F_5$, —$C_3F_7$, —$C_6F_{13}$, —$C_7F_{15}$ or —$CF(CF_3)[OCF_2CF(CF_3)]_pOC_3F_7$ (in the formula, p is 0, 1 or 2).

(j) The specific fluorine compound is a compound represented by the following formula (1).

(k) A reactive organic functional group of the silane coupling agent is a mercapto group or vinyl group.

Formula (1):

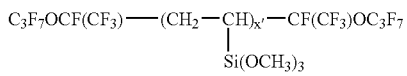

wherein x' is 2 or 3.

A method for surface treatment of rubber according to the present invention comprises the steps of causing a specific fluorine compound represented by the general formula (I) and a silane coupling agent to exist in the vicinity of the surface of a rubber base composed of crosslinked rubber; and heat-treating the rubber base.

The rubber base (crosslinked rubber), in which the specific fluorine compound and silane coupling agent exist in the vicinity of the surface thereof, is heat-treated, whereby a structure derived from the specific fluorine compound can be joined to a polymer main chain of the crosslinked rubber forming the rubber base through the silane coupling agent.

In other words, in the vicinity of the surface of the rubber base to be heat-treated, (i) reaction of the functional group ($R^1$) of the specific fluorine compound with a hydrolyzable group of the silane coupling agent, and (ii) reaction of a reactive organic functional group of the silane coupling agent with the polymer main chain of the crosslinked rubber take place.

Since chemical bonds are formed between the structure derived from the specific fluorine compound and the silane coupling agent and between the silane coupling agent and the polymer main chain of the crosslinked rubber as described above, the structure (surface-treating layer) derived from the specific fluorine compound comes to strongly adhere to the rubber base.

Further, since the hybrid formed by the reaction of the functional group of the specific fluorine compound with the hydrolyzable group of the silane coupling agent is excellent in heat stability and chemical stability and becomes insoluble or hardly soluble even in various solvents that are good solvents for the specific fluorine compound, the surface-treated effect by the specific fluorine compound can be stably exhibited without being extinguished or destroyed even when brought into contact with various solvents, so that the chemical resistance (oil resistance·solvent resistance) of the rubber can be markedly improved.

In a second method for surface treatment of rubber according to the present invention, the following embodiments are preferred.

(a) A solution of the silane coupling agent is coated on the surface of the rubber base composed of the crosslinked rubber, thereby causing the silane coupling agent to exist (adhere) in the vicinity of the surface of the rubber base, and a solution of the specific fluorine compound is coated on the surface of the rubber base, thereby causing the specific fluorine compound to exist (adhere) in the vicinity of the surface of the rubber base.

(b) A mixed solution of the specific fluorine compound and the silane coupling agent is coated on the surface of the rubber base composed of the crosslinked rubber, thereby causing the specific fluorine compound and the silane coupling agent to exist (adhere) in the vicinity of the surface of the rubber base.

(c) The rubber base composed of the crosslinked rubber is immersed in a solution of the silane coupling agent, thereby causing the silane coupling agent to exist (adhere) in the vicinity of the surface of the rubber base, and the rubber base is immersed in a solution of the specific fluorine compound, thereby causing the specific fluorine compound to exist (adhere) in the vicinity of the surface of the rubber base.

(d) The rubber base composed of the crosslinked rubber is immersed in a mixed solution of the specific fluorine compound and the silane coupling agent, thereby causing the specific fluorine compound and the silane coupling agent to exist (adhere) in the vicinity of the surface of the rubber base.

(e) In the general formula (I) representing the specific fluorine compound, the functional group represented by $R^1$ is an alkoxysilyl group or alkoxyalkoxysilyl group.

(f) In the general formula (I) representing the specific fluorine compound, the functional group represented by $R^1$ is a trimethoxysilyl group.

(g) In the general formula (I) representing the specific fluorine compound, the fluoroalkyl group-containing group represented by $R_F$ is represented by —$CF_3$, —$C_2F_5$, —$C_3F_7$, —$C_6F_{13}$, —$C_7F_{15}$ or —$CF(CF_3)[OCF_2CF(CF_3)]_pOC_3F_7$ (in the formula, p is 0, 1 or 2).

(h) The specific fluorine compound is a compound represented by the formula (1).

(i) A reactive organic functional group of the silane coupling agent is a mercapto group or vinyl group.

A process for production of a rubber article according to the present invention comprises the steps of:

molding and processing a rubber composition obtained by compounding and mixing 0.5 to 5 parts by mass of a silane coupling agent with 100 parts by mass of raw rubber, thereby obtaining a molding composed of crosslinked rubber, causing a specific fluorine compound to adhere to the surface of the molding, and heat-treating the molding, to the surface of which the specific fluorine compound has been caused to adhere.

The rubber is crosslinked in the presence of the silane coupling agent, whereby a reaction of the reactive organic functional group of the silane coupling agent with the polymer main chain of the rubber takes place together with the crosslinking reaction, thereby obtaining the crosslinked rubber, in which the silane coupling agent has been joined to the polymer main chain.

The specific fluorine compound is caused to adhere to the surface of the molding formed of this crosslinked rubber, and the molding is then heat-treated, whereby the functional group ($R^1$) of the specific fluorine compound is reacted with the hydrolyzable group of the silane coupling agent joined to the polymer main chain in the vicinity of the surface of the molding.

As a result, the structure derived from the specific fluorine compound can be joined to the polymer main chain of the crosslinked rubber in the vicinity of the surface of the molding through the silane coupling agent.

Since chemical bonds are formed between the structure derived from the specific fluorine compound and the silane coupling agent and between the silane coupling agent and the polymer main chain of the crosslinked rubber as described above, the structure (surface-treating layer) derived from the specific fluorine compound comes to strongly adhere to the surface of the molding that is the rubber base.

Further, since the hybrid formed by the reaction of the functional group of the specific fluorine compound with the hydrolyzable group of the silane coupling agent is excellent in heat stability and chemical stability and becomes insoluble or hardly soluble even in various solvents that are good solvents for the specific fluorine compound, the chemical resistance (oil resistance-solvent resistance) of the rubber article thus obtained can be markedly improved.

In the production process of the rubber article according to the present invention, the following embodiments are preferred.

(a) A solution of the specific fluorine compound is coated on the surface of the molding, thereby causing the specific fluorine compound to adhere to the surface of the molding.

(b) The molding is immersed in a solution of the specific fluorine compound, thereby causing the specific fluorine compound to adhere to the surface of the molding.

(c) In the general formula (I) representing the specific fluorine compound, the functional group represented by $R^1$ is an alkoxysilyl group or alkoxyalkoxysilyl group.

(d) In the general formula (I) representing the specific fluorine compound, the functional group represented by $R^1$ is a trimethoxysilyl group.

(e) In the general formula (I) representing the specific fluorine compound, the fluoroalkyl group-containing group represented by $R_F$ is represented by $-CF_3$, $-C_2F_5$, $-C_3F_7$, $-C_6F_{13}$, $-C_7F_{15}$ or $-CF(CF_3)[OCF_2CF(CF_3)]_pOC_3F_7$ (in the formula, p is 0, 1 or 2).

(f) The specific fluorine compound is a compound represented by the formula (1).

(g) A reactive organic functional group of the silane coupling agent is a mercapto group or vinyl group.

A first rubber composition according to the present invention comprises raw rubber, a crosslinking agent, a specific fluorine compound and a silane coupling agent.

In the first rubber composition according to the present invention, the functional group represented by $R^1$ in the general formula (I) is a group represented by a formula: $-Si(OR^{11})_3$ (in the formula, $R^{11}$ is an alkyl group or alkoxyalkyl group).

A second rubber composition according to the present invention comprises raw rubber, a crosslinking agent, a specific fluorine compound represented by the formula (1) and a silane coupling agent.

The rubber composition according to the present invention comprising the specific fluorine compound and the silane coupling agent as essential ingredients is molded and processed, whereby (a) crosslinking reaction of the rubber, (b) reaction (condensation reaction after hydrolysis) of the functional group ($R^1$) of the specific fluorine compound with the hydrolyzable group of the silane coupling agent, and (c) reaction (joining reaction) of the reactive organic functional group of the silane coupling agent with the polymer main chain of the rubber take place.

By these reactions, a rubber molding (rubber molding according to the present invention), in which the structure derived from the specific fluorine compound is joined to a polymer main chain of the crosslinked rubber through the silane coupling agent in the vicinity of at least the surface of the molding, is obtained.

Since chemical bonds are formed between the structure derived from the specific fluorine compound and the silane coupling agent and between the silane coupling agent and the polymer main chain of the crosslinked rubber in the vicinity of at least the surface of the rubber molding according to the present invention as described above, the structure derived from the specific fluorine compound comes to strongly adhere to the crosslinked rubber. Further, the hybrid formed by the reaction (condensation reaction after hydrolysis) of the functional group of the specific fluorine compound with the hydrolyzable group of the silane coupling agent becomes insoluble or hardly soluble even in various solvents that are good solvents for the specific fluorine compound. Accordingly, the surface properties of the rubber molding according to the present invention are not extinguished or destroyed even when these solvents are brought into contact therewith.

In the second rubber composition according to the present invention, 1 to 10 parts by mass, particularly 1 to 5 parts by mass of the specific fluorine compound represented by the formula (1) and 1 to 5 parts by mass, particularly 1 to 3 parts by mass of the silane coupling agent may preferably be contained in 100 parts by mass of the raw rubber.

A third rubber composition according to the present invention comprises raw rubber, a crosslinking agent, a specific fluorine compound, a silane coupling agent and silica.

A fourth rubber composition according to the present invention comprises raw rubber, a crosslinking agent, a specific fluorine compound represented by the formula (1), a silane coupling agent and silica.

In the fourth rubber composition according to the present invention, 1 to 10 parts by mass, particularly 1 to 5 parts by mass of the specific fluorine compound represented by the formula (1), 1 to 10 parts by mass, particularly 1 to 5 parts by mass of the silane coupling agent and 5 to 50 parts by mass, particularly 10 to 30 parts by mass of the silica may preferably be contained in 100 parts by mass of the raw rubber.

A first rubber article according to the present invention is subjected to the surface treatment by the first method according to the present invention, comprising the step of causing the specific fluorine compound and the silane coupling agent to exist in the vicinity of the surface of the rubber base composed of the uncrosslinked rubber.

A second rubber article according to the present invention is subjected to the surface treatment by the second method according to the present invention, comprising the step of causing the specific fluorine compound and the silane coupling agent to exist in the vicinity of the surface of the rubber base composed of the crosslinked rubber.

A rubber article according to the present invention is obtained in accordance with the production process of the present invention.

A rubber molding according to the present invention is obtained by molding and processing a rubber composition of the present invention.

A process for production of a rubber molding according to the present invention comprises the step of molding and processing a rubber composition of the present invention.

MODE FOR CARRYING OUT THE INVENTION

<Method for Surface Treatment of Rubber>

The first method for surface treatment according to the present invention comprises the steps of causing the specific fluorine compound represented by the general formula (I) and a silane coupling agent to exist in the vicinity of the surface of a rubber base composed of uncrosslinked rubber; and heat-treating the rubber base.

The second method for surface treatment according to the present invention comprises the steps of causing the specific fluorine compound represented by the general formula (I) and a silane coupling agent to exist in the vicinity of the surface of a rubber base composed of crosslinked rubber; and heat-treating the rubber base.

No particular limitation is imposed on the rubber base (raw rubber) treated by the methods for surface treatment according to the present invention, and as examples thereof, may be mentioned natural rubber (NR), isoprene rubber (IR), butadiene rubber (BR), chloroprene rubber (CR), butyl rubber (IIR), styrene-butadiene rubber (SBR), nitrile rubber (NBR), ethylene-propylene rubber (EPM, EPDM), acrylic rubber (ACM, ANM), epichlorohydrin rubber (CO, ECO), silicone rubber (VMQ, FVMQ), urethane rubber (AU, EU) and fluororubber (FKM, FEPM). In a rubber composition forming the rubber base, may be contained conventionally known various compounding ingredients for rubber, such as crosslinking agents, crosslink-accelerating agents (accelerators), antioxidants, fillers and plasticizers.

The specific fluorine compound used in the methods for surface treatment according to the present invention is a fluorine-containing oligomer having groups ($R_F$) containing a fluoroalkyl group at both ends of its molecule and a functional group ($R^1$) having reactivity to a hydrolyzable group in an intermediate chain thereof and having a molecular weight of about 500 to 50,000.

As specific examples of the groups ($R_F$) containing a fluoroalkyl group making up the specific fluorine compound, may be mentioned fluoroalkyl groups represented by $—C_qF_{2q+1}$ (q=1–10), such as $—CF_3$, $—C_2F_5$, $—C_3F_7$, $—C_6F_{13}$ and $—C_7F_{15}$; and groups (groups containing an oxyfluoroalkylene group and a fluoroalkyl group) represented by $—CF(CF_3)OC_3F_7$, $—CF(CF_3)[OCF_2CF(CF_3)]OC_3F_7$ and $—CF(CF_3)[OCF_2CF(CF_3)]_2OC_3F_7$. Among these, the group represented by $—CF(CF_3)OC_3F_7$ is particularly preferred.

The functional group ($R^1$) making up the specific fluorine compound has reactivity to a hydrolyzable group, and this reactivity secures the bonding to the silane coupling agent. As examples of such a functional group ($R^1$), may be mentioned alkoxysilyl groups such as a trimethoxysilyl group and a triethoxysilyl group; and alkoxyalkoxysilyl groups such as a tri(methoxymethoxy)silyl group, a tri(methoxyethoxy)silyl group, a tri(ethoxymethoxy)silyl group and a tri(ethoxyethoxy)silyl group. Among these, the alkoxysilyl groups are preferred, with the trimethoxysilyl group being particularly preferred.

The group ($R^2$) making up the specific fluorine compound is a hydrogen atom or an alkyl group such as a methyl group.

The groups ($R^3$, $R^4$) making up the specific fluorine compound are the same or different from each other and are individually a hydrogen atom or monovalent organic group, and a suitable group may be selected according to a function to be imparted to the surface of the rubber, or the like. As examples of the organic group represented by $R^3$ or $R^4$, may be mentioned $—CH_3$, $—COOH$, $—COO(CH_2)_2OH$, $—CO—N(CH_3)_2$ and

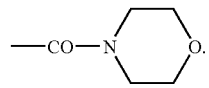

In the general formula (I) representing the specific fluorine compound, x is an integer of 1 to 100, preferably 1 to 50, more preferably 1 to 10, particularly preferably 1 to 5.

y is an integer of 0 to 500, preferably 0 to 100, more preferably 0 to 50, particularly preferably 0 to 10, most preferably 0 to 5.

The specific fluorine compound represented by the general formula (I) can be obtained by polymerizing a monomer represented by the following formula (IB) and a monomer represented by the following formula (IC) in the presence of a fluorine-containing peroxide represented by the following general formula (IA).

General Formula (IA):

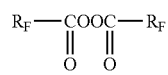

General Formula (IB):

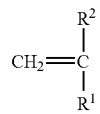

General Formula (IC):

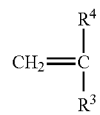

As examples of a preferable compound forming the specific fluorine compound, may be mentioned the compounds represented by the formula (1) and compounds represented by the following formulae (2) to (5). The compounds represented by the formula (1) and the following formula (2) are particularly preferred because a proportion of fluorine atoms (atoms contributing to improvement of surface properties) occupied in a molecule is high, and so the fluorine atoms can be caused to exist at a high efficiency in the vicinity of the surface of the rubber base.

Formula (2):

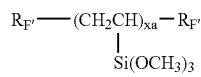

Formula (3):

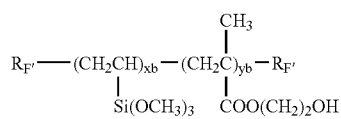

[In the formulae (2) and (3), $R_{F'}$ is a group represented by a formula: $—CF(CF_3)OCF_2CF(CF_3)OC_3F_7$.

In the formula (2), xa is an integer of 1 to 100.

In the formula (3), xb is an integer of 1 to 100, and yb is an integer of 1 to 500.]

Formula (4):

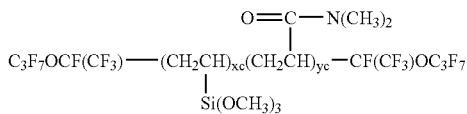

Formula (5):

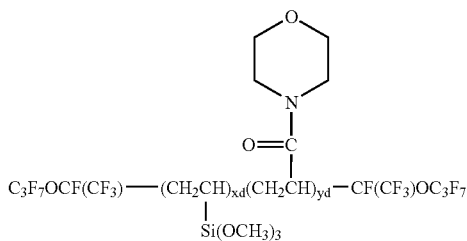

[In the formula (4), xc is an integer of 1 to 10, and yc is an integer of 0 to 100. In the formula (5), xd is an integer of 1 to 10, and yd is an integer of 0 to 100.]

The silane coupling agent used in the method of surface treatment according to the present invention reacts with both specific fluorine compound and polymer main chain of the rubber to form strong bonds between them. As examples of such a silane coupling agent, may be mentioned those represented by the following formula (6). Formula (6): $Si(OR^5)_m R^6_{3-m}—(CH_2)_n—R^7$ In the formula (6) representing the silane coupling agent, $R^5$ is an alkyl group or alkoxyalkyl group, and $R^6$ is an alkyl group. m is an integer of 1 to 3 and is preferably 3, and n is an integer of 0 to 5, preferably 0 to 3.

The hydrolyzable group $[Si(OR^5)_m R^6_{3-m}—]$ of the silane coupling agent is reacted with the functional group ($R^1$) of the specific fluorine compound, whereby a hybrid excellent in heat stability and chemical stability is formed.

As examples of such a hydrolyzable group, may be mentioned alkoxysilyl groups such as a trimethoxysilyl group.

In the formula (6) representing the silane coupling agent, $R^7$ is an organic functional group having reactivity to the polymer main chain of the rubber.

As examples of the reactive organic functional group ($R^7$), may be mentioned amino, mercapto, vinyl, (meth) acryloyloxy, epoxy and ureido groups. Among these, the mercapto group having reactivity to a polymer main chain of rubber having an unsaturated bond and the vinyl group having reactivity to a polymer main chain of rubber having no unsaturated bond may be mentioned as preferable functional groups.

The reactive organic functional group ($R^7$) is selected according to the kind (whether an unsaturated bond is present in the polymer main chain or not) of the rubber used as described above, whereby the same kind of compound may be used as the specific fluorine compound for various kinds of rubber.

In the first method for surface treatment according to the present invention, the specific fluorine compound and silane coupling agent arecaused to exist in the vicinity of the surface of the base rubber composed of uncrosslinked rubber.

In the second method for surface treatment according to the present invention, the specific fluorine compound and silane coupling agent arecaused to exist in the vicinity of the surface of the base rubber composed of crosslinked rubber.

The mode of "causing to exist in the vicinity of the surface of the rubber base" in the present invention includes the mode of containing the specific fluorine compound and silane coupling agent in the vicinity of at least the surface in the interior of the rubber base in addition to the mode of causing these compounds to adhere to the surface of the rubber base.

Incidentally, it is not necessary to cause the whole amount of the specific fluorine compound and silane coupling agent to exist (unevenly distribute) in the vicinity of the surface of the rubber base, and at least one of the specific fluorine compound and silane coupling agent may be evenly contained in the interior of the rubber base.

As methods for causing the specific fluorine compound and silane coupling agent to exist in the vicinity of the surface of the rubber base composed of "uncrosslinked rubber", may be mentioned (i) a method comprising coating the surface of the rubber base composed of uncrosslinked rubber with a solution of the silane coupling agent and moreover coating the surface of the rubber base with a solution of the specific fluorine compound, (ii) a method comprising coating the surface of the rubber base composed of uncrosslinked rubber with a mixed solution of the specific fluorine compound and the silane coupling agent, and (iii) a method comprising compounding and mixing thesilane coupling agent with rubber, thereby forming a rubber base (rubber base containing the silane coupling agent) composed of uncrosslinked rubber, and coating the surface of the rubber base with a solution of specific fluorine compound.

As methods for causing the specific fluorine compound and silane coupling agent to exist in the vicinity of the surface of the rubber base composed of "crosslinked rubber", may be mentioned (iv) a method comprising coating the surface of the rubber base composed of crosslinked rubber with a solution of the silane coupling agent and moreover coating thesurface of the rubber base with a solution of the specific fluorine compound, and (v) a method comprising coating the surface of the rubber base composed of crosslinked rubber with a mixed solution of the specific fluorine compound and the silane coupling agent.

In the methods (ii) and (v), the term "mixed solution of the specific fluorine compound and silane coupling agent" means a solution with the specific fluorine compound and silane coupling agent dissolved in a proper solvent.

In the methods (i), (iii) and (iv), as a solvent for preparing "the solution of the specific fluorine compound", may be used water, methanol, ethanol, tetrahydrofuran, chloroform, benzene, ethyl acetate, dimethyl sulfoxide (DMSO), N,N-dimethylformamide (DMF), toluene, acetone, hexane, a substitute flon (HCFC, HFC or PFC type) employed in uses such as precise cleaning, or the like.

In the methods (i), (ii), (iv) and (v), as a solvent for preparing "the solution of the silane coupling agent" or "the mixed solution", may be used an organic solvent such as methanol, ethanol or hexane.

"The solution of the specific fluorine compound" used in the methods (i), (iii) and (iv), and "the mixed solution used in the methods (ii) and (v) are preferably acid or alkaline and particularly preferably acid (pH of 6 or lower, particularly 3 to 5). The reaction of the functional group ($R^1$) of the specific fluorine compound with the hydrolyzable group of the silane coupling agent is thereby efficiently carried out to accelerate the formation of the hybrid. As examples of an acid added and contained for acidifying these solutions, may be mentioned inorganic acids such as hydrochloric acid, nitric acid and sulfuric acid; and organic acid such as formic acid, acetic acid, propionic acid, butanoic acid and pentanoic acid. Among these, acetic acid is preferred.

In the method (iii), the amount of the silane coupling agent compounded is, for example, 0.5 to 2 parts by mass per 100 parts by mass of the raw rubber though it varies according to the amount of a filler compounded into the uncrosslinked rubber, or the like.

No particular limitation is imposed on a method for coating with the solution of the specific fluorine compound and/or the silane coupling agent in the methods (i) to (v). However, a method (immersion method, dipping method) of immersing the rubber base in the solution is preferred.

Incidentally, as a coating method on a large rubber base having a wide area, may also be adopted a brushing, spraying, a method by atomizing, a method using various kinds of coater, or the like.

The rubber base, in which the specific fluorine compound and silane coupling agent exist in the vicinity of the surface thereof, is heat-treated, whereby the specific fluorine compound (functional group $R^1$) is reacted with the silane coupling agent (hydrolyzable group) to form a hybrid (hybrid of the specific fluorine compound with the silane coupling agent). In addition, the silane coupling agent (reactive organic functional group $R^7$) is reacted with the polymer main chain of the rubber to join the hybrid containing the structure derived from the specific fluorine compound to the polymer main chain.

The following formula (7) represents an exemplary hybrid structure having siloxane bonds formed by a condensation reaction of a hydrolyzate of the specific fluorine compound represented by the formula (1) with a hydrolyzate of the silane coupling agent represented by the formula (6) (wherein, m=3). Incidentally, no joined state between the silane coupling agent and the polymer main chain is shown in the following formula (7). In a rubber article surface-treated in accordance with the method of the present invention, however, the silane coupling agent is actually joined to the polymer main chain of the rubber through the organic functional group ($R^7$).

Formula (7):

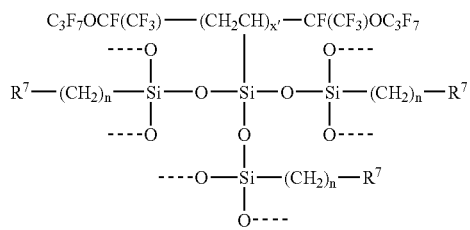

Conditions for the heat treatment of the rubber base are prescribed from the viewpoint of allowing (a) the crosslinking reaction of rubber (in the case where the rubber base is composed of uncrosslinked rubber), (b) the condensation reaction of the specific fluorine compound with the silane coupling agent and (c) the reaction of the silane coupling agent with the polymer main chain of the rubber to sufficiently proceed. More specifically, the heat treatment is carried out at 70 to 180° C. for 5 to 60 minutes. As a method of the heat treatment, heating by means of pressing is preferred in the case where the rubber base is composed of uncrosslinked rubber, while heating by a thermostatic chamber (oven) is preferred in the case where the rubber base is composed of crosslinked rubber.

The surface treatment according to the methods of the present invention can be carried out on rubber bases forming belts, pulleys, hoses, tubes, gaskets, O-rings, packing, diaphragms, wipers, rolls, cables, cushioning pads, blankets (particularly, surface layer) for printing, grommets, various kinds of sealing materials, various kinds of sheet materials, etc. to impart tack-free property, surface lubricity, water and oil repellency, anti-staining property, antibacterial property, physiological activity and the like to the surfaces of these rubber bases.

<Process for Production of Rubber Article>

The production processes according to the present invention comprise the step (hereinafter also referred to as "molding step") of molding and processing a rubber composition obtained by compounding and mixing a silane coupling agent, thereby obtaining a molding composed of crosslinked rubber, the step (hereinafter also referred to as "adhesion step of a fluorine compound") of causing a specific fluorine compound to adhere to the surface of the molding, and the step (hereinafter also referred to as "heating step") of heat-treating the molding, to the surface of which the specific fluorine compound has been caused to adhere.

The molding step in the production process according to the present invention is a step of molding and processing a rubber composition obtained by compounding and mixing a silane coupling agent, thereby obtaining a molding composed of crosslinked rubber.

The term "molding and processing" as used herein means that the form of a rubber article is provided, and the rubber is crosslinked.

No particular limitation is imposed on the rubber (raw rubber making up the rubber composition) used in the production process according to the present invention, and as examples thereof, may be mentioned natural rubber (NR), isoprene rubber (IR), butadiene rubber (BR), chloroprene rubber (CR), butyl rubber (IIR), styrene-butadiene rubber (SBR), nitrile rubber (NBR), ethylene-propylene rubber (EPM, EPDM), acrylic rubber (ACM, ANM), epichlorohydrin rubber (CO, ECO), silicone rubber (VMQ, FVMQ), urethane rubber (AU, EU) and fluororubber (FKM, FEPM).

The silane coupling agent (ingredient for the rubber composition) used in the production process according to the present invention has both hydrolyzable group and reactive organic functional group in its molecule and reacts with both specific fluorine compound and polymer main chain of the crosslinked rubber to form strong bonds between them. As examples of such a silane coupling agent, may be mentioned those represented by the following formula (6).

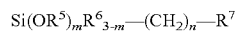  Formula (6):

In the formula (6) representing the silane coupling agent, $R^5$ is an alkyl group or alkoxyalkyl group, and $R^6$ is an alkyl group. m is an integer of 1 to 3 and is preferably 3, and n is an integer of 0 to 5, preferably 0 to 3.

The hydrolyzable group [$Si(OR^5)_m R^6_{3-m}$—] of the silane coupling agent is reacted with the functional group ($R^1$) of the specific fluorine compound, whereby a hybrid excellent in heat stability and chemical stability is formed.

As examples of such a hydrolyzable group, may be mentioned alkoxysilyl groups such as a trimethoxysilyl group.

In the formula (6) representing the silane coupling agent, $R^7$ is an organic functional group having reactivity to the polymer main chain of the rubber.

As examples of the reactive organic functional group ($R^7$), may be mentioned amino, mercapto, vinyl, (meth) acryloyloxy, epoxy and ureido groups. Among these, the mercapto group having reactivity to a polymer main chain of rubber having an unsaturated bond and the vinyl group having reactivity to a polymer main chain of rubber having no unsaturated bond may be mentioned as preferable functional groups.

The reactive organic functional group ($R^7$) is selected according to the kind (whether an unsaturated bond is present in the polymer main chain or not) of the rubber used as described above, whereby the same kind of compound may be used as the specific fluorine compound for various kinds of rubber.

The amount of the silane coupling agent compounded into the rubber composition is, for example, 0.5 to 5 parts by mass, preferably 0.5 to 2 parts by mass, particularly preferably 0.75 to 2 parts by mass per 100 parts by mass of the raw rubber though it varies according to the amount of a filler compounded into the rubber composition, or the like. If the amount of the silane coupling agent compounded is less than 0.5 parts by mass, the structure derived from the specific fluorine compound cannot be efficiently joined to the polymer main chain of the crosslinked rubber, so that the expected effect by the treatment cannot be imparted to the surface of the resulting molding. If the amount exceeds 5 parts by mass on the other hand, no effect corresponding to such a compounding amount can be achieved.

In the rubber composition comprising the raw rubber and silane coupling agent as essential ingredients, may be contained conventionally known various compounding ingredients for rubber, such as crosslinking agents, crosslink-accelerating agents, antioxidants, fillers and plasticizers.

No particular limitation is also imposed on the mixing method for obtaining the rubber composition, and any conventionally known method using a mixer may be adopted.

No particular limitation is also imposed on the molding and processing method, and any conventionally known method (for example, press molding) for obtaining a molding composed of crosslinked rubber may be adopted.

Incidentally, the crosslinking of the rubber is conducted under conditions of, for example, 140 to 180° C. for 5 to 60 minutes.

In the molding step in the production process according to the present invention, the rubber is crosslinked in the presence of the silane coupling agent, whereby a reaction of the reactive organic functional group of the silane coupling agent with the polymer main chain of the rubber takes place together with such crosslinking reaction, thereby obtaining the crosslinked rubber, in which the silane coupling agent has been joined to the polymer main chain.

The adhesion step of the fluorine compound in the production process according to the present invention is a step of causing the specific fluorine compound to adhere to the surface of the molding (rubber base) formed of the crosslinked rubber obtained in the molding step.

The specific fluorine compound used in the production process according to the present invention is a fluorine-containing oligomer having groups ($R_F$) containing a fluoroalkyl group at both ends of its molecule and a functional group ($R^1$) having reactivity to a hydrolyzable group in an intermediate chain thereof and having a molecular weight of about 500 to 50,000.

As specific examples of the groups ($R_F$) containing a fluoroalkyl group making up the specific fluorine compound, may be mentioned fluoroalkyl groups represented by $-C_qF_{2q+1}$ (q=1–10), such as $-CF_3$, $-C_2F_5$, $-C_3F_7$, $-C_6F_{13}$ and $-C_7F_{15}$; and groups (groups containing an oxyfluoroalkylene group and a fluoroalkyl group) represented by $-CF(CF_3)OC_3F_7$, $-CF(CF_3)[OCF_2CF(CF_3)]OC_3F_7$ and $-CF(CF_3)[OCF_2CF(CF_3)]_2OC_3F_7$. Among these, the group represented by $-CF(CF_3)OC_3F_7$ is particularly preferred.

The functional group ($R^1$) making up the specific fluorine compound has reactivity to a hydrolyzable group, and this reactivity secures the bonding to the silane coupling agent. As examples of such a functional group ($R^1$), may be mentioned alkoxysilyl groups such as a trimethoxysilyl group and a triethoxysilyl group; and alkoxyalkoxysilyl groups such as a tri(methoxymethoxy)silyl group, a tri(methoxyethoxy)silyl group, a tri(ethoxymethoxy)silyl group and a tri(ethoxyethoxy)silyl group. Among these, the alkoxysilyl groups are preferred, with the trimethoxysilyl group being particularly preferred.

The group ($R^2$) making up the specific fluorine compound is a hydrogen atom or an alkyl group such as a methyl group.

The groups ($R^3$, $R^4$) making up the specific fluorine compound are the same or different from each other and are individually a hydrogen atom or monovalent organic group, and a suitable group may be selected according to a function to be imparted to the surface of the rubber, or the like. As examples of the organic group represented by $R^3$ or $R^4$, may be mentioned $-CH_3$, $-COOH$, $-COO(CH_2)_2OH$, $-CO-N(CH_3)_2$ and

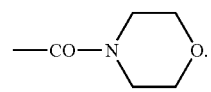

In the general formula (I) representing the specific fluorine compound, x is an integer of 1 to 100, preferably 1 to 50, more preferably 1 to 10, particularly preferably 1 to 5.

y is an integer of 0 to 500, preferably 0 to 100, more preferably 0 to 50, particularly preferably 0 to 10, most preferably 0 to 5.

The specific fluorine compound represented by the general formula (I) can be obtained by polymerizing a monomer represented by the following general formula (IB) and a monomer represented by the following general formula (IC) in the presence of a fluorine-containing peroxide represented by the following general formula (IA).

General Formula (IA):

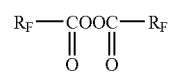

General Formula (IB):

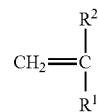

-continued

General Formula (IC):

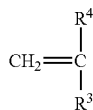

As examples of a preferable compound forming the specific fluorine compound, may be mentioned the compounds represented by the formula (1) and compounds represented by the following formulae (2) to (5). The compounds represented by the formula (1) and the following formula (2) are particularly preferred because a proportion of fluorine atoms (atoms contributing to improvement of surface properties) occupied in a molecule is high, and so the fluorine atoms can be caused to exist at a high efficiency in the vicinity of the surface of the molding (rubber base).

Formula (2):

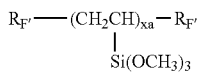

Formula (3):

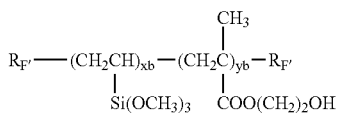

[In the formulae (2) and (3), $R_{F'}$ is a group represented by a formula: $-CF(CF_3)OCF_2CF(CF_3)OC_3F_7$.

In the formula (2), xa is an integer of 1 to 100.

In the formula (3), xb is an integer of 1 to 100, and yb is an integer of 1 to 500.]

Formula (4):

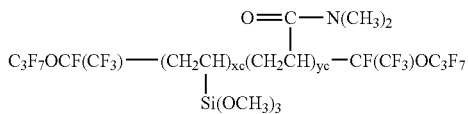

Formula (5):

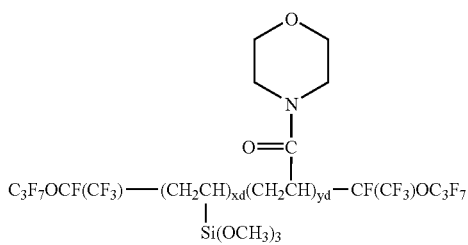

[In the formula (4), xc is an integer of 1 to 10, and yc is an integer of 0 to 100. In the formula (5), xd is an integer of 1 to 10, and yd is an integer of 0 to 100.]

As a process for causing the specific fluorine compound to adhere to the surface of the molding (rubber base) composed of the crosslinked rubber, may be mentioned a process comprising dissolving the specific fluorine compound in a proper solvent to prepare a solution, and coating the surface of the molding with this solution.

As the solvent dissolving the specific fluorine compound therein, may be used water, methanol, ethanol, tetrahydrofuran, chloroform, benzene, ethyl acetate, dimethyl sulfoxide (DMSO), N,N-dimethylformamide (DMF), toluene, acetone, hexane, a substitute flon (HCFC, HFC or PFC type) employed in uses such as precise cleaning, or the like.

The solution of the specific fluorine compound is preferably acid or alkaline and particularly preferably acid (pH of 6 or lower, particularly 3 to 5). The reaction of the functional group ($R^1$) of the specific fluorine compound with the hydrolyzable group of the silane coupling agent is thereby efficiently carried out to accelerate the formation of the hybrid. As examples of an acid added and contained for acidifying the solution, may be mentioned inorganic acids such as hydrochloric acid, nitric acid and sulfuric acid; and organic acid such as formic acid, acetic acid, propionic acid, butanoic acid and pentanoic acid. Among these, acetic acid is preferred.

No particular limitation is imposed on a method for applying (coating with) the solution of the specific fluorine compound. However, a method (immersion method) of immersing the molding in the solution is preferred.

Incidentally, as an application method to a large molding having a wide area, may also be adopted a brushing, spraying, a method by atomizing, a method using various kinds of coater, or the like.

The heating step in the production process according to the present invention is a step of heat-treating the molding, to the surface of which the specific fluorine compound has been caused to adhere.

Conditions for the heating are prescribed from the viewpoint of allowing the condensation reaction of the specific fluorine compound with the silane coupling agent to sufficiently proceed. More specifically, the heating is carried out at 70 to 180° C. for 5 to 60 minutes. As a method of the heat treatment, is preferred a method making use of a thermostatic chamber equipped with a ventilating function.

The heat treatment is conducted, whereby the hydrolyzable group of the silane coupling agent joined to the polymer main chain is reacted with the functional group ($R^1$) of the specific fluorine compound in the vicinity of the surface of the molding (rubber base) to form a hybrid (hybrid of the specific fluorine compound with the silane coupling agent) excellent in heat stability and chemical stability. The structure derived from the specific fluorine compound can be thereby joined to the polymer main chain of the crosslinked rubber in the vicinity of the surface of the molding through the silane coupling agent.

The following formula (7) represents an exemplary hybrid structure having siloxane bonds formed by a condensation reaction of a hydrolyzate of the specific fluorine compound represented by the formula (1) with a hydrolyzate of the silane coupling agent represented by the formula (6) (wherein, m=3). Incidentally, no joined state between the silane coupling agent and the polymer main chain is shown in the following formula (7). In a rubber article obtained in accordance with the production process of the present invention, however, the silane coupling agent is actually joined to the polymer main chain of the rubber through the organic functional group ($R^7$).

Formula (7):

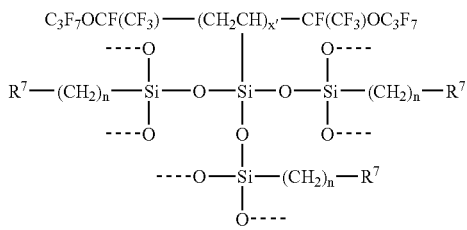

The respective steps (molding step, adhesion step of the fluorine compound and heating step) described above provide a rubber article (surface-treated rubber article), in which the structure derived from the specific fluorine compound is joined to the polymer main chain of the crosslinked rubber in the vicinity of the surface of the molding through the silane coupling agent.

Since chemical bonds are formed between the structure derived from the specific fluorine compound and the silane coupling agent and between the silane coupling agent and the polymer main chain of the crosslinked rubber in the rubber article in such a manner, the structure (surface-treating layer) derived from the specific fluorine compound comes to strongly adhere to the surface of the molding.

Further, since the hybrid formed by the reaction of the functional group ($R^1$) of the specific fluorine compound with the hydrolyzable group of the silane coupling agent is excellent in heat stability and chemical stability and becomes insoluble or hardly soluble even in various solvents that are good solvents for the specific fluorine compound, the chemical resistance (oil resistance-solvent resistance) of the rubber article can be markedly improved.

No particular limitation is imposed on the form of rubber articles obtained by the production process according to the present invention. The rubber articles obtained by the production process according to the present invention include those a part of the component members of which is made of rubber.

The rubber articles obtained by the production process of the present invention can be used as belts, pulleys, hoses, tubes, gaskets, O-rings, packing, diaphragms, wipers, rolls, cables, cushioning pads, blankets for printing, grommets, various kinds of sealing materials, various kinds of sheet materials, etc.

<Rubber Composition>

The rubber compositions according to a first embodiment of the present invention comprise raw rubber, a crosslinking agent, the specific fluorine compound and a silane coupling agent as essential ingredients, and the rubber compositions according to a second embodiment of the present invention comprise silica as an additional essential ingredient.

No particular limitation is imposed on the raw rubber making up the rubber compositions according to the present invention, and as examples thereof, may be mentioned natural rubber (NR), isoprene rubber (IR), butadiene rubber (BR), chloroprene rubber (CR), butyl rubber (IIR), styrene-butadiene rubber (SBR), nitrile rubber (NBR), ethylene-propylene rubber (EPM, EPDM), acrylic rubber (ACM, ANM), epichlorohydrin rubber (CO, ECO), silicone rubber (VMQ, FVMQ), urethane rubber (AU, EU) and fluororubber (FKM, FEPM).

The crosslinking agent making up the rubber compositions according to the present invention varies according to the kind of the raw rubber, or the like, and no particular limitation is imposed thereon. However, as examples thereof, may be mentioned sulfur, sulfur chloride, organic sulfur-containing compounds, organic peroxides, metal oxides, quinone dioxime, organic polyvalent amines and modified phenol resins. Among these, sulfur is preferably used.

When sulfur is used as the crosslinking agent, the content thereof is generally 0.5 to 2 parts by mass per 100 parts by mass of the raw rubber.

The specific fluorine compound making up the rubber compositions according to the present invention is a fluorine-containing oligomer having groups ($R_F$) containing a fluoroalkyl group at both ends of its molecule and a functional group ($R^1$) having reactivity to a hydrolyzable group in an intermediate chain thereof and having a molecular weight of about 500 to 50,000.

As specific examples of the groups ($R_F$) containing a fluoroalkyl group making up the specific fluorine compound, may be mentioned fluoroalkyl groups represented by —$C_qF_{2q+1}$ (q=1–10), such as —$CF_3$, —$C_2F_5$, —$C_3F_7$, —$C_6F_{13}$ and —$C_7F_{15}$; and groups (groups containing an oxyfluoroalkylene group and a fluoroalkyl group) represented by —$CF(CF_3)OC_3F_7$, —$CF(CF_3)[OCF_2CF(CF_3)]OC_3F_7$ and —$CF(CF_3)[OCF_2CF(CF_3)]_2OC_3F_7$. Among these, the group represented by —$CF(CF_3)OC_3F_7$ is particularly preferred.

The functional group ($R^1$) making up the specific fluorine compound has reactivity to a hydrolyzable group, and this reactivity secures the bonding to the silane coupling agent. As examples of such a functional group ($R^1$), may be mentioned groups represented by a formula: —$Si(OR^{11})_3$ (in the formula, $R^{11}$ is an alkyl group or alkoxyalkyl group).

The group represented by —$Si(OR^{11})_3$ making up the specific fluorine compound has reactivity to the hydrolyzable group of the silane coupling agent, and this reactivity secures the bonding of the specific fluorine compound to the silane coupling agent.

As examples of the alkyl group represented by $R^{11}$, may be mentioned methyl and ethyl groups, and as examples of the alkoxyalkyl group represented by $R^{11}$, may be mentioned methoxymethyl, methoxyethyl, ethoxymethyl and ethoxyethyl groups.

The group ($R^2$) in the specific fluorine compound is a hydrogen atom or an alkyl group such as a methyl group.

The groups ($R^3$, $R^4$) making up the specific fluorine compound are the same or different from each other and are individually a hydrogen atom or monovalent organic group, and a suitable group may be selected according to a function to be imparted to the surface of the rubber, or the like. As examples of the organic group represented by $R^3$ or $R^4$, may be mentioned —$CH_3$, —COOH, —COO($CH_2$)$_2$OH, —CO—N($CH_3$)$_2$ and

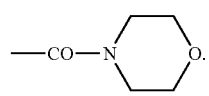

In the general formula (I) representing the specific fluorine compound, x is an integer of 1 to 100, preferably 1 to 50, more preferably 1 to 10, particularly preferably 1 to 5.

y is an integer of 0 to 500, preferably 0 to 100, more preferably 0 to 50, particularly preferably 0 to 10, most preferably 0 to 5.

The specific fluorine compound represented by the general formula (I) can be obtained by polymerizing a monomer represented by the following general formula (IB) and a monomer represented by the following general formula (IC) in the presence of a fluorine-containing peroxide represented by the following general formula (IA).

General Formula (IA):

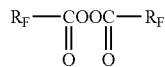

General Formula (IB):

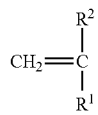

General Formula (IC):

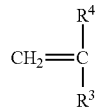

As examples of a preferable compound forming the specific fluorine compound, may be mentioned the compounds represented by the formula (1) and compounds represented by the following formulae (2) to (5). The compounds represented by the formula (1) and the following formula (2) are particularly preferred because a proportion of fluorine atoms (atoms contributing to improvement of surface properties) occupied in a molecule is high, and so the fluorine atoms can be caused to exist at a high efficiency on the surface of a finally obtained rubber molding.

Formula (2):

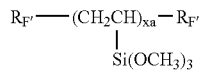

Formula (3):

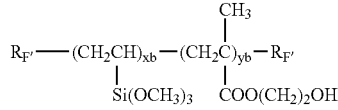

[In the formulae (2) and (3), $R_{F'}$ is a group represented by a formula: —$CF(CF_3)OCF_2CF(CF_3)OC_3F_7$.

In the formula (2), xa is an integer of 1 to 100.

In the formula (3), xb is an integer of 1 to 100, and yb is an integer of 1 to 500.]

Formula (4):

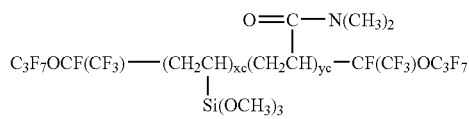

-continued

Formula (5):

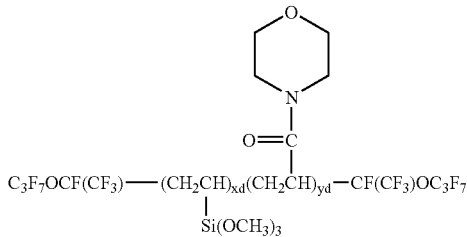

[In the formula (4), xc is an integer of 1 to 10, and yc is an integer of 0 to 100. In the formula (5), xd is an integer of 1 to 10, and yd is an integer of 0 to 100.]

In a rubber composition according to the present invention, the content of the specific fluorine compound represented by the formula (1) is preferably 1 to 10 parts by mass, more preferably 1 to 5 parts by mass per 100 parts by mass of the raw rubber.

If the content of the specific fluorine compound is too low, the surface properties of the resulting rubber molding cannot be sufficiently improved. If this content is too high on the other hand, the resulting rubber molding may be caused to incur deterioration of the mechanical properties thereof in some cases.

The silane coupling agent making up the rubber compositions according to the present invention has both hydrolyzable group and reactive organic functional group in its molecule and reacts with both specific fluorine compound and polymer main chain of the rubber to form strong bonds between them. As examples of such a silane coupling agent, may be mentioned those represented by the following formula (6).

  Formula (6):

In the formula (6) representing the silane coupling agent, $R^5$ is an alkyl group or alkoxyalkyl group, and $R^6$ is an alkyl group. m is an integer of 1 to 3 and is preferably 3, and n is an integer of 0 to 5, preferably 0 to 3.

The hydrolyzable group [$Su(OR^5)_mR^6_{3-m}$—] of the silane coupling agent is reacted (condensation reaction after hydrolysis) with the functional group ($R^1$) [for example, a group represented by —$Si(OR^{11})_3$] of the specific fluorine compound, whereby a hybrid excellent in heat stability and chemical stability is formed.

As examples of the hydrolyzable group of the silane coupling agent, may be mentioned alkoxysilyl groups such as a trimethoxysilyl group.

In the formula (6) representing the silane coupling agent, $R^7$ is an organic functional group having reactivity to the polymer main chain of the rubber.

As examples of the reactive organic functional group ($R^7$), may be mentioned amino, mercapto, vinyl, (meth)acryloyloxy, epoxy and ureido groups. Among these, the mercapto group having reactivity to a polymer main chain of raw rubber having an unsaturated bond and the vinyl group having reactivity to a polymer main chain of raw rubber having no unsaturated bond may be mentioned as preferable functional groups.

The reactive organic functional group ($R^7$) is selected according to the kind (whether an unsaturated bond is present in the polymer main chain or not) of the raw rubber as described above, whereby the same kind of compound may be used as the specific fluorine compound for various kinds of raw rubber.

In a rubber composition according to the first embodiment of the present invention, the content of the silane coupling agent is preferably 1 to 5 parts by mass, more preferably 1 to 3 parts by mass per 100 parts by mass of the raw rubber.

In a rubber composition according to the second embodiment of the present invention comprising silica as an essential ingredient, the content of the silane coupling agent is preferably 1 to 10 parts by mass, more preferably 1 to 5 parts by mass per 100 parts by mass of the raw rubber.

If the content of the silane coupling agent is either too low or too high, the structure derived from the specific fluorine compound cannot be efficiently joined to the polymer main chain of the rubber, so that the surface properties of the resulting rubber molding cannot be sufficiently improved.

Silica making up the rubber compositions according to the second embodiment of the present invention may be either wet silica (hydrous silicic acid) or dry silica (silicic acid anhydride).

The rubber compositions according to the second embodiment of the present invention comprising silica as an essential ingredient can be particularly preferably used for obtaining rubber articles, into which no carbon black can be compounded, such as some kinds of rubber articles used in relation to waterworks.

In a rubber composition according to the second embodiment of the present invention, content of the silica is preferably 5 to 50 parts by mass, more preferably 10 to 30 parts by mass.

If the content of the silica is too low, the expected reinforcing effect cannot be imparted to the resulting rubber molding. If this content is too high on the other hand, an excess amount of the silica reacts with the silane coupling agent to be reacted with the specific fluorine compound, so that the surface properties of the resulting rubber molding may not be sufficiently improved in some cases.

The rubber compositions according to the present invention may contain conventionally known various compounding ingredients for rubber, such as crosslink-accelerating agents, antioxidants, fillers and plasticizers.

No particular limitation is imposed on the mixing method for obtaining the rubber compositions according to the present invention, and any conventionally known method using a mixer may be adopted.

<Rubber Molding and Production Process Thereof>

The rubber molding according to the present invention is a molding composed of crosslinked rubber obtained by molding and processing the rubber composition according to the present invention.

The term "molding and processing" as used herein means that the form of a rubber molding is provided, and the rubber is crosslinked. No particular limitation is imposed on the molding and processing method, and any conventionally known method (for example, press molding) for obtaining a molding composed of crosslinked rubber may be adopted. Incidentally, the crosslinking of the rubber is conducted under conditions of, for example, 140 to 180° C. for 5 to 60 minutes.

The rubber composition according to the present invention is molded and processed, whereby a reaction (condensation reaction after hydrolysis) of the functional group ($R^1$) (for example, a group represented by —$Si(OR^{11})_3$] of the specific fluorine compound with the hydrolyzable group [$Si(OR^5)_m R^6_{3-m}$—] of the silane coupling agent, and a reaction of the reactive organic functional group ($R^7$) of the silane coupling agent with the polymer main chain of the rubber take place together with the crosslinking reaction of the raw rubber.

A rubber molding (rubber molding according to the present invention), in which the structure derived from the specific fluorine compound has been joined to the polymer main chain of the crosslinked rubber through the silane coupling agent in the vicinity of at least the surface of the molding, is thereby obtained.

The following formula (7) represents an exemplary hybrid structure having siloxane bonds formed by a reaction (condensation reaction after hydrolysis) of the functional group [—$Si(OCH_3)_3$] of the specific fluorine compound represented by the formula (1) with the silane coupling agent represented by the formula (6) (wherein, m=3). Incidentally, no joined state between the silane coupling agent and the polymer main chain is shown in the following formula (7). However, the silane coupling agent making up the rubber molding according to the present invention is actually joined to the polymer main chain of the rubber through the organic functional group ($R^7$).

Formula (7):

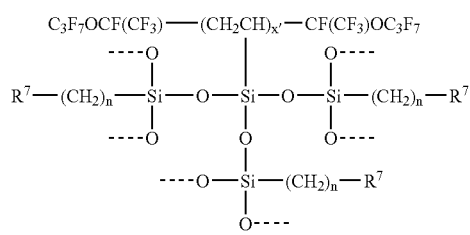

Since chemical bonds are formed between the structure derived from the specific fluorine compound and the silane coupling agent and between the silane coupling agent and the polymer main chain of the crosslinked rubber in the vicinity of at least the surface of the rubber molding according to the present invention as described above, the structure derived from the specific fluorine compound comes to strongly adhere to the crosslinked rubber. Further, since the hybrid formed by the reaction of the functional group ($R^1$) [for example, a group represented by —$Si(OR^{11})_3$] of the specific fluorine compound with the hydrolyzable group [$Si(OR^5)_m R^6_{3-m}$—] of the silane coupling agent is excellent in heat stability and chemical stability and becomes insoluble or hardly soluble even in various solvents that are good solvents for the specific fluorine compound. Accordingly, even when these solvents are brought into contact with the rubber molding according to the present invention, the surface properties (for example, water and oil repellency, anti-staining property and physiological activity) imparted thereto by the specific fluorine compound are not extinguished or destroyed.

The rubber moldings according to the present invention can be used as belts, pulleys, hoses, tubes, gaskets, O-rings, packing, diaphragms, wipers, rolls, cables, cushioning pads, blankets for printing, grommets, various kinds of sealing materials, various kinds of sheet materials, etc.

BEST MODE FOR CARRYING OUT THE INVENTION

The present invention will hereinafter be described by the following examples. However, the present invention is not limited thereby. Incidentally, all designations of "part" or "parts" as will be used in the following examples mean part-or parts by mass.

PREPARATION EXAMPLE 1

After 2 drops of acetic acid were added to about 100 mL of a mixed solvent composed of 95% by volume of ethanol and 5% by volume of water, a specific fluorine compound represented by the formula (1) was added to the mixed solvent to prepare a treatment solution containing the specific fluorine compound at a concentration of 1% by mass.

PREPARATION EXAMPLE 2

After 2 drops of acetic acid were added to about 100 mL of a mixed solvent "Asahi Clin AK-225" (product of Asahi Glass Co., Ltd.) composed of HCFC-225ca ($CF_3CF_2CHCl_2$) and HCFC-225cb ($CClF_2CF_2CHClF$), a specific fluorine compound represented by the formula (2) (wherein, xa=2–3) was added to the mixed solvent and uniformly dispersed therein, thereby preparing a treatment solution containing the specific fluorine compound at a concentration of 1% by mass.

PREPARATION EXAMPLE 3

After 2 drops of acetic acid were added to about 100 mL of a mixed solvent composed of 95% by volume of methanol and 5% by volume of water, a specific fluorine compound represented by the formula (3) (wherein, xb=1–10, yb=1–100) was added to the mixed solvent to prepare a treatment solution containing the specific fluorine compound at a concentration of 1% by mass.

PREPARATION EXAMPLE 4

After 2 drops of acetic acid were added to about 100 mL of a mixed solvent composed of 95% by volume of ethanol and 5% by volume of water, a specific fluorine compound represented by the formula (1) and a silane coupling agent "A-189" (product of Nippon Unicar Co., Ltd.) represented by a formula: $Si(OCH_3)_3$—$(CH_2)_3$—SH were added to the mixed solvent to prepare a treatment solution containing the specific fluorine compound and the silane coupling agent at concentrations of each 1% by mass.

PREPARATION EXAMPLE 5

After 2 drops of acetic acid were added to about 100 mL of hexane, a specific fluorine compound represented by the formula (1) and a silane coupling agent "A-189" were added to the mixed solvent to prepare a treatment solution containing the specific fluorine compound and the silane coupling agent at concentrations of 5% by mass and 1% by mass respectively.

EXAMPLE A1

One hundred parts of nitrile rubber "Nipol DN202H" (product of Nippon Zeon Co., Ltd.) were mixed with 1 part of sulfur, 5 parts of zinc oxide, 1 part of stearic acid "Adeka Fatty Acid SA-300", 1 part of a crosslink-accelerating agent "NOCCELER ZTC" (product of Ouchi-Shinko Chemical Industrial Co., Ltd.), 4 parts of a crosslink-accelerating agent "NOCCELER TOT-N" (product of Ouchi-Shinko Chemical Industrial Co., Ltd.) and 2 parts of a crosslink-accelerating agent "NOCCELER DM" (product of Ouchi-Shinko Chemical Industrial Co., Ltd.) by 8-inch rolls in accordance with its corresponding formulation shown in Table 1, thereby producing an uncrosslinked rubber sheet (rubber base) composed of a nitrile rubber composition.

The uncrosslinked rubber sheet thus obtained was then immersed for 30 minutes in an ethanol solution (concentration: 1% by mass) of a silane coupling agent "A-189", and the uncrosslinked rubber sheet was dried at room temperature to remove the solvent (ethanol).

Thereafter, the uncrosslinked rubber sheet was immersed for 30 minutes in the treatment solution prepared in Preparation Example 1, and the uncrosslinked rubber sheet was dried at room temperature to remove the mixed solvent.

The uncrosslinked rubber sheet, in which the specific fluorine compound and silane coupling agent had been caused to exist in the vicinity of the surface thereof in the above-described manner, was heat-treated (subjected to crosslinking treatment) at 150° C. for 10 minutes by a press, thereby producing a crosslinked rubber sheet surface-treated with the specific fluorine compound represented by the formula (1).

EXAMPLE A2

One hundred parts of nitrile rubber "Nipol DN202H" (product of Nippon Zeon Co., Ltd.) were mixed with 1 part of sulfur, 5 parts of zinc oxide, 1 part of stearic acid "Adeka Fatty Acid SA-300", 1 part of a crosslink-accelerating agent "NOCCELER ZTC" (product of Ouchi-Shinko Chemical Industrial Co., Ltd.), 4 parts of a crosslink-accelerating agent "NOCCELER TOT-N" (product of Ouchi-Shinko Chemical Industrial Co., Ltd.), 2 parts of a crosslink-accelerating agent "NOCCELER DM" (product of Ouchi-Shinko Chemical Industrial Co., Ltd.) and 1 part of a silane coupling agent "A-189" (product of Nippon Unicar Co., Ltd.) by 8-inch rolls in accordance with its corresponding formulation shown in Table 1, thereby producing an uncrosslinked rubber sheet composed of a nitrile rubber composition.

The uncrosslinked rubber sheet thus obtained was then immersed for 30 minutes in the treatment solution prepared in Preparation Example 1, and the uncrosslinked rubber sheet was dried at room temperature to remove the mixed solvent.

The uncrosslinked rubber sheet, in which the specific fluorine compound and silane coupling agent had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (1).

EXAMPLE A3

An uncrosslinked rubber sheet composed of a nitrile rubber composition was produced in the same manner as in Example A2 except that the amount of the silane coupling agent compounded was changed to 2 parts in accordance with its corresponding formulation shown in Table 1.

The uncrosslinked rubber sheet thus obtained was then immersed for 30 minutes in the treatment solution prepared in Preparation Example 1, and the uncrosslinked rubber sheet was dried at room temperature to remove the mixed solvent.

The uncrosslinked rubber sheet, in which the specific fluorine compound and silane coupling agent had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (1).

EXAMPLE A4

An uncrosslinked rubber sheet having the same composition as in Example A1 was produced in accordance with its corresponding formulation shown in Table 1.

The uncrosslinked rubber sheet thus obtained was then immersed for 30 minutes in an ethanol solution (concentration: 1% by mass) of a silane coupling agent "A-189", and the uncrosslinked rubber sheet was dried at room temperature to remove the solvent.

Thereafter, the uncrosslinked rubber sheet was immersed for 30 minutes in the treatment solution prepared in Preparation Example 2, and the uncrosslinked rubber sheet was dried at room temperature to remove the mixed solvent.

The uncrosslinked rubber sheet, in which the specific fluorine compound and silane coupling agent had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (2).

EXAMPLE A5

An uncrosslinked rubber sheet having the same composition as in Example A2 was produced in accordance with its corresponding formulation shown in Table 1.

The uncrosslinked rubber sheet thus obtained was then immersed for 30 minutes in the treatment solution prepared in Preparation Example 2, and the uncrosslinked rubber sheet was dried at room temperature to remove the mixed solvent.

The uncrosslinked rubber sheet, in which the specific fluorine compound and silane coupling agent had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (2).

EXAMPLE A6

An uncrosslinked rubber sheet having the same composition as in Example A3 was produced in accordance with its corresponding formulation shown in Table 1.

The uncrosslinked rubber sheet thus obtained was then immersed for 30 minutes in the treatment solution prepared in Preparation Example 2, and the uncrosslinked rubber sheet was dried at room temperature to remove the mixed solvent.

The uncrosslinked rubber sheet, in which the specific fluorine compound and silane coupling agent had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (2).

EXAMPLE A7

An uncrosslinked rubber sheet having the same composition as in Example A1 was produced in accordance with its corresponding formulation shown in Table 1.

The uncrosslinked rubber sheet thus obtained was then immersed for 30 minutes in an ethanol solution (concentration: 1% by mass) of a silane coupling agent "A-189", and the uncrosslinked rubber sheet was dried at room temperature to remove the solvent.

Thereafter, the uncrosslinked rubber sheet was immersed for 30 minutes in the treatment solution prepared in Preparation Example 3, and the uncrosslinked rubber sheet was dried at room temperature to remove the mixed solvent.

The uncrosslinked rubber sheet, in which the specific fluorine compound and silane coupling agent had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (3).

EXAMPLE A8

An uncrosslinked rubber sheet having the same composition as in Example A2 was produced in accordance with its corresponding formulation shown in Table 1.

The uncrosslinked rubber sheet thus obtained was then immersed for 30 minutes in the treatment solution prepared in Preparation Example 3, and the uncrosslinked rubber sheet was dried at room temperature to remove the mixed solvent.

The uncrosslinked rubber sheet, in which the specific fluorine compound and silane coupling agent had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (3).

EXAMPLE A9

An uncrosslinked rubber sheet having the same composition as in Example A3 was produced in accordance with its corresponding formulation shown in Table 1.

The uncrosslinked rubber sheet thus obtained was then immersed for 30 minutes in the treatment solution prepared in Preparation Example 3, and the uncrosslinked rubber sheet was dried at room temperature to remove the mixed solvent.

The uncrosslinked rubber sheet, in which the specific fluorine compound and silane coupling agent had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (3).

EXAMPLE A10

An uncrosslinked rubber sheet having the same composition as in Example A1 was produced in accordance with its corresponding formulation shown in Table 1.

The uncrosslinked rubber sheet thus obtained was then immersed for 30 minutes in the treatment solution prepared in Preparation Example 4, and the uncrosslinked rubber sheet was dried at room temperature to remove the mixed solvent.

The uncrosslinked rubber sheet, in which the specific fluorine compound and silane coupling agent had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (1).

COMPARATIVE EXAMPLE a1

An uncrosslinked rubber sheet having the same composition as in Example A1 was produced in accordance with its corresponding formulation shown in Table 1. The uncrosslinked rubber sheet thus obtained was then heat-treated at 150° C. for 10 minutes by a press, thereby producing a crosslinked rubber sheet subjected to no surface treatment with any specific fluorine compound.

COMPARATIVE EXAMPLE a2

An uncrosslinked rubber sheet having the same composition as in Example A1 was produced in accordance with its corresponding formulation shown in Table 1. The uncrosslinked rubber sheet thus obtained was then immersed for 30 minutes in the treatment solution prepared in Preparation Example 1, and the uncrosslinked rubber sheet was dried at room temperature to remove the mixed solvent. The uncrosslinked rubber sheet, in which the specific fluorine compound had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (1). This comparative example is an instance that the surface treatment was conducted without causing a silane coupling agent to exist in the vicinity of the surface of the uncrosslinked rubber sheet that is a rubber base.

COMPARATIVE EXAMPLE a3

An uncrosslinked rubber sheet having the same composition as in Example A1 was produced in accordance with its corresponding formulation shown in Table 1. The uncrosslinked rubber sheet thus obtained was then immersed for 30 minutes in the treatment solution prepared in Preparation Example 2, and the uncrosslinked rubber sheet was dried at room temperature to remove the mixed solvent. The uncrosslinked rubber sheet, in which the specific fluorine compound had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (2). This comparative example is an instance that the surface treatment was conducted without causing a silane coupling agent to exist in the vicinity of the surface of the uncrosslinked rubber sheet that is a rubber base.

COMPARATIVE EXAMPLE a4

An uncrosslinked rubber sheet having the same composition as in Example A1 was produced in accordance with its corresponding formulation shown in Table 1. The uncrosslinked rubber sheet thus obtained was then immersed for 30 minutes in the treatment solution prepared in Preparation Example 3, and the uncrosslinked rubber sheet was dried at room temperature to remove the mixed solvent. The uncrosslinked rubber sheet, in which the specific fluorine compound had been caused to exist in the vicinity of the surface thereof in the above-described manner, was heat-treated at 150° C. for 10 minutes by a press, thereby producing a crosslinked rubber sheet surface-treated with the specific fluorine compound represented by the formula (3). This comparative example is an instance that the surface treatment was conducted without causing a silane coupling agent to exist in the vicinity of the surface of the uncrosslinked rubber sheet that is a rubber base.

EXAMPLE B1

One hundred parts of nitrile rubber "Nipol DN202H" (product of Nippon Zeon Co., Ltd.) were mixed with 1 part of sulfur, 5 parts of zinc oxide, 1 part of stearic acid "Adeka Fatty Acid SA-300", 1 part of a crosslink-accelerating agent "NOCCELER ZTC" (product of Ouchi-Shinko Chemical Industrial Co., Ltd.), 4 parts of a crosslink-accelerating agent "NOCCELER TOT-N" (product of Ouchi-Shinko Chemical Industrial Co., Ltd.) and 2 parts of a crosslink-accelerating agent "NOCCELER DM" (product of Ouchi-Shinko Chemical Industrial Co., Ltd.) by 8-inch rolls, thereby producing an uncrosslinked rubber sheet composed of a nitrile rubber composition. This uncrosslinked rubber sheet was heat-treated (subjected to crosslinking treatment) at 150° C. for 10 minutes by a press, thereby producing a crosslinked rubber sheet (rubber base).

The crosslinked rubber sheet thus obtained was then immersed for 30 minutes in an ethanol solution (concentration: 1% by mass) of a silane coupling agent "A-189" (product of Nippon Unicar Co., Ltd.) represented by a formula: $Si(OCH_3)_3$—$(CH_2)_3$—$SH$, and the crosslinked rubber sheet was dried at room temperature to remove the solvent.

Thereafter, the crosslinked rubber sheet was immersed for 30 minutes in the treatment solution prepared in Preparation Example 1, and the crosslinked rubber sheet was dried at room temperature to remove the mixed solvent.

The crosslinked rubber sheet, in which the specific fluorine compound and silane coupling agent had been caused to exist in the vicinity of the surface thereof in the above-described manner, was heat-treated for 10 minutes in a thermostatic chamber (150° C.) equipped with a ventilating function, thereby producing a crosslinked rubber sheet surface-treated with the specific fluorine compound represented by the formula (1).

EXAMPLE B2

A crosslinked rubber sheet (rubber base) having the same composition as in Example B1 was produced.

The crosslinked rubber sheet thus obtained was then immersed for 30 minutes in an ethanol solution (concentration: 1% by mass) of a silane coupling agent "A-189", and the crosslinked rubber sheet was dried at room temperature to remove the solvent.

Thereafter, the crosslinked rubber sheet was immersed for 30 minutes in the treatment solution prepared in Preparation Example 2, and the crosslinked rubber sheet was dried at room temperature to remove the mixed solvent.

The crosslinked rubber sheet, in which the specific fluorine compound and silane coupling agent had been caused to exist in the vicinity of the surface thereof in the above-described manner, was heat-treated for 10 minutes in a thermostatic chamber (150° C.) equipped with a ventilating function, thereby producing a crosslinked rubber sheet surface-treated with the specific fluorine compound represented by the formula (2).

EXAMPLE B3

A crosslinked rubber sheet (rubber base) having the same composition as in Example B1 was produced.

The crosslinked rubber sheet thus obtained was then immersed for 30 minutes in an ethanol solution (concentration: 1% by mass) of a silane coupling agent "A-189", and the crosslinked rubber sheet was dried at room temperature to remove the solvent.

Thereafter, the crosslinked rubber sheet was immersed for 30 minutes in the treatment solution prepared in Preparation Example 3, and the crosslinked rubber sheet was dried at room temperature to remove the mixed solvent.

The crosslinked rubber sheet, in which the specific fluorine compound and silane coupling agent had been caused to exist in the vicinity of the surface thereof in the above-described manner, was heat-treated for 10 minutes in a thermostatic chamber (150° C.) equipped with a ventilating function, thereby producing a crosslinked rubber sheet surface-treated with the specific fluorine compound represented by the formula (3).

EXAMPLE B4

A crosslinked rubber sheet (rubber base) having the same composition as in Example B1 was produced.

The crosslinked rubber sheet thus obtained was then immersed for 30 minutes in the treatment solution prepared in Preparation Example 4, and the crosslinked rubber sheet was dried at room temperature to remove the mixed solvent.

The crosslinked rubber sheet, in which the specific fluorine compound and silane coupling agent had been caused to exist in the vicinity of the surface thereof in the above-described manner, was heat-treated for 10 minutes in a thermostatic chamber (150° C.) equipped with a ventilating function, thereby producing a crosslinked rubber sheet surface-treated with the specific fluorine compound represented by the formula (1).

COMPARATIVE EXAMPLE b1

A crosslinked rubber sheet (rubber base) having the same composition as in Example B1 was produced.

COMPARATIVE EXAMPLE b2

A crosslinked rubber sheet (rubber base) having the same composition as in Example B1 was produced.

The crosslinked rubber sheet thus obtained was then immersed for 30 minutes in the treatment solution prepared in Preparation Example 1, and the crosslinked rubber sheet was dried at room temperature to remove the mixed solvent.

The crosslinked rubber sheet, in which the specific fluorine compound had been caused to exist in the vicinity of the surface thereof in the above-described manner, was heat-treated for 10 minutes in a thermostatic chamber (150° C.) equipped with a ventilating function, thereby producing a crosslinked rubber sheet surface-treated with the specific fluorine compound represented by the formula (1). This comparative example is an instance that the surface treatment was conducted without causing a silane coupling agent to exist in the vicinity of the surface of the crosslinked rubber sheet that is a rubber base.

COMPARATIVE EXAMPLE b3

A crosslinked rubber sheet (rubber base) having the same composition as in Example B1 was produced.

The crosslinked rubber sheet thus obtained was then immersed for 30 minutes in the treatment solution prepared in Preparation Example 2, and the crosslinked rubber sheet was dried at room temperature to remove the mixed solvent.

The crosslinked rubber sheet, in which the specific fluorine compound had been caused to exist in the vicinity of the surface thereof in the above-described manner, was heat-treated for 10 minutes in a thermostatic chamber (150° C.) equipped with a ventilating function, thereby producing a crosslinked rubber sheet surface-treated with the specific fluorine compound represented by the formula (2). This comparative example is an instance that the surface treatment was conducted without causing a silane coupling agent to exist in the vicinity of the surface of the crosslinked rubber sheet that is a rubber base.

COMPARATIVE EXAMPLE b4

A crosslinked rubber sheet (rubber base) having the same composition as in Example B1 was produced.

The crosslinked rubber sheet thus obtained was then immersed for 30 minutes in the treatment solution prepared in Preparation Example 3, and the crosslinked rubber sheet was dried at room temperature to remove the mixed solvent.

The crosslinked rubber sheet, in which the specific fluorine compound had been caused to exist in the vicinity of the surface thereof in the above-described manner, was heat-treated for 10 minutes in a thermostatic chamber (150° C.) equipped with a ventilating function, thereby producing a crosslinked rubber sheet surface-treated with the specific fluorine compound represented by the formula (3). This comparative example is an instance that the surface treatment was conducted without causing to exist in the vicinity of the surface of the crosslinked rubber sheet that is a rubber base.

EXAMPLE C1

[1] Molding Step:

One hundred parts of nitrile rubber "Nipol DN401" (product of Nippon Zeon Co., Ltd.; AN content: 18%) were mixed with 1 part of sulfur, 5 parts of zinc oxide, 1 part of a crosslink-accelerating agent "NOCCELER ZTC" (product of Ouchi-Shinko Chemical Industrial Co., Ltd.), 4 parts of a crosslink-accelerating agent "NOCCELER TOT-N" (product of Ouchi-Shinko Chemical Industrial Co., Ltd.), 2 parts of a crosslink-accelerating agent "NOCCELER DM" (product of Ouchi-Shinko Chemical Industrial Co., Ltd.) and 1 part of a silane coupling agent "A-189" (product of Nippon Unicar Co., Ltd.) represented by a formula: $Si(OCH_3)_3$—$(CH_2)_3$—$SH$ by 8-inch rolls in accordance with its corresponding formulation shown in Table 3, thereby producing an uncrosslinked rubber sheet composed of a nitrile rubber composition. This uncrosslinked rubber sheet was press-molded at 150° C. for 10 minutes, thereby producing a crosslinked rubber sheet (molding that is a rubber base).

[2] Adhesion Step of Fluorine Compound:

After the crosslinked rubber sheet obtained by the above-described molding step was immersed for 30 minutes in the treatment solution obtained in Preparation Example 1, the crosslinked rubber sheet was dried at room temperature to remove the mixed solvent, thereby causing the specific fluorine compound to adhere to the surface of the crosslinked rubber sheet.

[3] Heating Step:

The crosslinked rubber sheet, to the surface of which the specific fluorine compound had been caused to adhere by the adhesion step of the fluorine compound, was heat-treated for 10 minutes in a thermostatic chamber (150° C.) equipped with a ventilating function, thereby producing a crosslinked rubber sheet (rubber article according to the present invention) surface-treated with the specific fluorine compound represented by the formula (1).

EXAMPLE C2

An uncrosslinked rubber sheet composed of a nitrile rubber composition was produced by mixing the respective ingredients in the same manner as in the molding step of Example C1 except that the amount of the silane coupling agent compounded was changed to 2 parts in accordance with its corresponding formulation shown in Table 3. This uncrosslinked rubber sheet was press-molded at 150° C. for 10 minutes, thereby producing a crosslinked rubber sheet.

After the crosslinked rubber sheet thus obtained was immersed for 30 minutes in the treatment solution obtained in Preparation Example 1, the crosslinked rubber sheet was dried at room temperature to remove the mixed solvent, thereby causing the specific fluorine compound to adhere to the surface of the crosslinked rubber sheet.

Thereafter, the crosslinked rubber sheet was heat-treated at 150° C. for 10 minutes in the same manner as in the heating step of Example C1, thereby producing a crosslinked rubber sheet (rubber article according to the present invention) surface-treated with the specific fluorine compound represented by the formula (1).

EXAMPLE C3

An uncrosslinked rubber sheet composed of a nitrile rubber composition was produced by mixing the respective ingredients in the same manner as in the molding step of Example C1 in accordance with its corresponding formulation shown in Table 3. This uncrosslinked rubber sheet was press-molded at 150° C. for 10 minutes, thereby producing a crosslinked rubber sheet.

After this crosslinked rubber sheet was immersed for 30 minutes in the treatment solution obtained in Preparation Example 2, the crosslinked rubber sheet was dried at room temperature to remove the mixed solvent, thereby causing the specific fluorine compound to adhere to the surface of the crosslinked rubber sheet.

Thereafter, the crosslinked rubber sheet was heat-treated at 150° C. for 10 minutes in the same manner as in the heating step of Example C1, thereby producing a crosslinked rubber sheet (rubber article according to the present invention) surface-treated with the specific fluorine compound represented by the formula (2).

EXAMPLE C4

An uncrosslinked rubber sheet composed of a nitrile rubber composition was produced by mixing the respective ingredients in the same manner as in the molding step of Example C1 except that the amount of the silane coupling agent compounded was changed to 2 parts in accordance with its corresponding formulation shown in Table 3. This uncrosslinked rubber sheet was press-molded at 150° C. for 10 minutes, thereby producing a crosslinked rubber sheet.

After this crosslinked rubber sheet was immersed for 30 minutes in the treatment solution obtained in Preparation Example 2, the crosslinked rubber sheet was dried at room temperature to remove the mixed solvent, thereby causing the specific fluorine compound to adhere to the surface of the crosslinked rubber sheet.

Thereafter, the crosslinked rubber sheet was heat-treated at 150° C. for 10 minutes in the same manner as in the heating step of Example C1, thereby producing a crosslinked rubber sheet (rubber article according to the present invention) surface-treated with the specific fluorine compound represented by the formula (2).

EXAMPLE C5

An uncrosslinked rubber sheet composed of a nitrile rubber composition was produced by mixing the respective ingredients in the same manner as in the molding step of Example C1 in accordance with its corresponding formulation shown in Table 3. This uncrosslinked rubber sheet was press-molded at 150° C. for 10 minutes, thereby producing a crosslinked rubber sheet.

After this crosslinked rubber sheet was immersed for 30 minutes in the treatment solution obtained in Preparation Example 3, the crosslinked rubber sheet was dried at room temperature to remove the mixed solvent, thereby causing the specific fluorine compound to adhere to the surface of the crosslinked rubber sheet.

Thereafter, the crosslinked rubber sheet was heat-treated at 150° C. for 10 minutes in the same manner as in the heating step of Example C1, thereby producing a crosslinked rubber sheet (rubber article according to the present invention) surface-treated with the specific fluorine compound represented by the formula (3).

EXAMPLE C6

An uncrosslinked rubber sheet composed of a nitrile rubber composition was produced by mixing the respective ingredients in the same manner as in the molding step of Example C1 except that the amount of the silane coupling agent compounded was changed to 2 parts in accordance with its corresponding formulation shown in Table 3. This uncrosslinked rubber sheet was press-molded at 150° C. for 10 minutes, thereby producing a crosslinked rubber sheet.

After this crosslinked rubber sheet was immersed for. 30 minutes in the treatment solution obtained in Preparation Example 3, the crosslinked rubber sheet was dried at room temperature to remove the mixed solvent, thereby causing the specific fluorine compound to adhere to the surface of the crosslinked rubber sheet.

Thereafter, the crosslinked rubber sheet was heat-treated at 150° C. for 10 minutes in the same manner as in the heating step of Example C1, thereby producing a crosslinked rubber sheet (rubber article according to the present invention) surface-treated with the specific fluorine compound represented by the formula (3).

COMPARATIVE EXAMPLE c1

An uncrosslinked rubber sheet composed of a nitrile rubber composition was produced by mixing the respective ingredients in the same manner as in the molding step of Example C1 except that no silane coupling agent was compounded in accordance with its corresponding formulation shown in Table 3. This uncrosslinked rubber sheet was press-molded at 150° C. for 10 minutes, thereby producing a crosslinked rubber sheet (comparative rubber article).

COMPARATIVE EXAMPLE c2

An uncrosslinked rubber sheet composed of a nitrile rubber composition was produced by mixing the respective ingredients in the same manner as in the molding step of Example C1 except that no silane coupling agent was compounded in accordance with its corresponding formulation shown in Table 3. This uncrosslinked rubber sheet was press-molded at 150° C. for 10 minutes, thereby producing a crosslinked rubber sheet.

After the crosslinked rubber sheet thus obtained was immersed for 30 minutes in the treatment solution obtained in Preparation Example 1, the crosslinked rubber sheet was dried at room temperature to remove the mixed solvent, thereby causing the specific fluorine compound to adhere to the surface of the crosslinked rubber sheet.

Thereafter, the crosslinked rubber sheet was heat-treated at 150° C. for 10 minutes in the same manner as in the heating step of Example C1, thereby producing a crosslinked rubber sheet (comparative rubber article) surface-treated with the specific fluorine compound represented by the formula (1).

COMPARATIVE EXAMPLE c3

An uncrosslinked rubber sheet composed of a nitrile rubber composition was produced by mixing the respective ingredients in the same manner as in the molding step of Example C1 except that no silane coupling agent was compounded in accordance with its corresponding formulation shown in Table 3. This uncrosslinked rubber sheet was press-molded at 150° C. for 10 minutes, thereby producing a crosslinked rubber sheet.

After the crosslinked rubber sheet thus obtained was immersed for 30 minutes in the treatment solution obtained in Preparation Example 2, the crosslinked rubber sheet was dried at room temperature to remove the mixed solvent, thereby causing the specific fluorine compound to adhere to the surface of the crosslinked rubber sheet.

Thereafter, the crosslinked rubber sheet was heat-treated at 150° C. for 10 minutes in the same manner as in the heating step of Example C1, thereby producing a crosslinked rubber sheet (comparative rubber article) surface-treated with the specific fluorine compound represented by the formula (2).

COMPARATIVE EXAMPLE c4

An uncrosslinked rubber sheet composed of a nitrile rubber composition was produced by mixing the respective ingredients in the same manner as in the molding step of Example C1 except that no silane coupling agent was compounded in accordance with its corresponding formulation shown in Table 3. This uncrosslinked rubber sheet was press-molded at 150° C. for 10 minutes, thereby producing a crosslinked rubber sheet.

After the crosslinked rubber sheet thus obtained was immersed for 30 minutes in the treatment solution obtained in Preparation Example 3, the crosslinked rubber sheet was dried at room temperature to remove the mixed solvent, thereby causing the specific fluorine compound to adhere to the surface of the crosslinked rubber sheet.

Thereafter, the crosslinked rubber sheet was heat-treated at 150° C. for 10 minutes in the same manner as in the heating step of Example C1, thereby producing a crosslinked rubber sheet (comparative rubber article) surface-treated with the specific fluorine compound represented by the formula (3).

EXAMPLES D1–D6

One hundred parts of nitrile rubber "Nipol DN401" (product of Nippon Zeon Co., Ltd.; AN content: 18%) were mixed with 1 part of sulfur, 5 parts of zinc oxide, 1 part of a crosslink-accelerating agent "NOCCELER ZTC" (product of Ouchi-Shinko Chemical Industrial Co., Ltd.), 4 parts of a crosslink-accelerating agent "NOCCELER TOT-N" (product of Ouchi-Shinko Chemical Industrial Co., Ltd.), 2 parts of a crosslink-accelerating agent "NOCCELER DM" (product of Ouchi-Shinko Chemical Industrial Co., Ltd.), a specific fluorine compound represented by the formula (1) and a silane coupling agent "A-189" (product of Nippon Unicar Co., Ltd.) represented by a formula: $Si(OCH_3)_3$—$(CH_2)_3$—SH by 8-inch rolls in accordance with their corresponding formulations shown in Table 4, thereby obtaining nitrile rubber compositions (rubber compositions according to the present invention).

An uncrosslinked rubber sheet composed of each of the nitrile rubber compositions thus obtained was press-molded at 150° C. for 10 minutes, thereby producing a crosslinked rubber sheet (rubber molding according to the present invention).

COMPARATIVE EXAMPLE d1

A comparative nitrile rubber composition was obtained by mixing in the same manner as in Example D2 except that no silane coupling agent "A-189" was compounded.

An uncrosslinked rubber sheet composed of the nitrile rubber composition thus obtained was press-molded at 150° C. for 10 minutes, thereby producing a crosslinked rubber sheet (comparative rubber molding).

EXAMPLES D7–D12

Nitrile rubber compositions (rubber compositions according to the present invention) were obtained by mixing in the same manner as in their corresponding Examples D1 to D6 except that 20 parts of silica were compounded in accordance with their corresponding formulations shown in Table 4.

An uncrosslinked rubber sheet composed of each of the nitrile rubber compositions thus obtained was press-molded at 150° C. for 10 minutes, thereby producing a crosslinked rubber sheet (rubber molding according to the present invention).

COMPARATIVE EXAMPLES d2–d3

Comparative nitrile rubber compositions were obtained by mixing in the same manner as in their corresponding Examples D7 and D8 except that no silane coupling agent "A-189" was compounded in accordance with their corresponding formulations shown in Table 4.

An uncrosslinked rubber sheet composed of each of the nitrile rubber compositions thus obtained was press-molded at 150° C. for 10 minutes, thereby producing a crosslinked rubber sheet (comparative rubber molding).

<Evaluation (1) of Sheet>

(1) Existing Amount (Initial Value) of Fluorine Atom:

With respect to the respective crosslinked rubber sheets obtained in Examples A1 to A10 and Comparative Examples a1 to a4, Examples B1 to B4 and Comparative Examples b1 to b4, Examples C1 to C6 and Comparative Examples c1 to c4, and Examples D1 to D12 and Comparative Examples d1 to d3, amounts (the number of fluorine atoms per carbon atom) of fluorine atoms existing on the surfaces of the sheets were measured by means of an X-ray photoelectron spectroscopic analyzer (XPS). It may safely be said that the surface properties such as water repellency and oil repellency become better as the existing amount increases. The results are shown in Tables 1 to 4. Measuring conditions are as follows:

(Measuring Conditions)
Type of service apparatus: Perkin Elmer PHI 5600 ESCA System,
Pressure in the chamber (conditions of reduced pressure): $2.8 \times 10^{-7}$ Pa,
Correction: correct C1s to 285.0 eV by a neutralizing gun,
X-rays: AlKα monochromatic X-rays,
Irradiating angle of X-rays: 45° to 55°,
Measuring region: 800 μm×2000 μm.

(2) Existing Amount (Retention After Solvent Extraction) of Fluorine Atom:

With respect to the respective crosslinked rubber sheets obtained in the above-described Examples and Comparative Examples, amounts of fluorine atoms existing on the surfaces of the sheets were measured again after the sheets were subjected to contact treatment (Soxhlet extraction, extraction time=12 hours) with each of the solvents shown in Tables 1 to 4, thereby finding a retention to the value (initial value) before extraction. It may safely be said that when this retention is at least 90%, the expected surface properties developed by the surface-treating layer of the crosslinked rubber sheet are not extinguished or destroyed even when brought into contact with such a solvent. The results are shown collectively in Tables 1 to 4.

TABLE 1

| | | | | Example | | | | | | | | | |
|---|---|---|---|---|---|---|---|---|---|---|---|---|---|
| | | | | A1 | A2 | A3 | A4 | A5 | A6 | A7 | A8 | A9 | A10 |
| Formulation of nitrile rubber composition | NBR (DN202H) | | | 100 | 100 | 100 | 100 | 100 | 100 | 100 | 100 | 100 | 100 |
| | Sulfur | | | 1 | 1 | 1 | 1 | 1 | 1 | 1 | 1 | 1 | 1 |
| | Zinc oxide | | | 5 | 5 | 5 | 5 | 5 | 5 | 5 | 5 | 5 | 5 |
| | Stearic acid | | | 1 | 1 | 1 | 1 | 1 | 1 | 1 | 1 | 1 | 1 |
| | NOCCELER ZTC | | | 1 | 1 | 1 | 1 | 1 | 1 | 1 | 1 | 1 | 1 |
| | NOCCELER TOT-N | | | 4 | 4 | 4 | 4 | 4 | 4 | 4 | 4 | 4 | 4 |
| | NOCCELER DM | | | 2 | 2 | 2 | 2 | 2 | 2 | 2 | 2 | 2 | 2 |
| | Silane coupling agent | | | — | 1 | 2 | — | 1 | 2 | — | 1 | 2 | — |
| Immersion treatment | Silane coupling agent | | | Run | — | — | Run | — | — | Run | — | — | — |
| | Fluorine compound | Prep. Ex. 1 | Formula (1) | Run | Run | Run | — | — | — | — | — | — | — |
| | | Prep. Ex. 2 | Formula (2) | — | — | — | Run | Run | Run | — | — | — | — |
| | | Prep. Ex. 3 | Formula (3) | — | — | — | — | — | — | Run | Run | Run | — |
| | | Prep. Ex. 4 | Formula (1) | — | — | — | — | — | — | — | — | — | Run |
| Existing amount of fluorine atom | Initial value [F/C] | | | 0.95 | 0.82 | 0.86 | 1.01 | 0.93 | 0.94 | 0.65 | 0.58 | 0.59 | 0.96 |
| | Retention after solvent extraction [%] | Methanol | | 90≦ | 90≦ | 90≦ | 90≦ | 90≦ | 90≦ | 90≦ | 90≦ | 90≦ | 90≦ |
| | | Ethanol | | 90≦ | 90≦ | 90≦ | 90≦ | 90≦ | 90≦ | 90≦ | 90≦ | 90≦ | 90≦ |
| | | THF | | 90≦ | 90≦ | 90≦ | 90≦ | 90≦ | 90≦ | 90≦ | 90≦ | 90≦ | 90≦ |
| | | Benzene | | 90≦ | 90≦ | 90≦ | 90≦ | 90≦ | 90≦ | 90≦ | 90≦ | 90≦ | 90≦ |
| | | Toluene | | 90≦ | 90≦ | 90≦ | 90≦ | 90≦ | 90≦ | 90≦ | 90≦ | 90≦ | 90≦ |
| | | Acetone | | 90≦ | 90≦ | 90≦ | 90≦ | 90≦ | 90≦ | 90≦ | 90≦ | 90≦ | 90≦ |

| | | | | Comp. Example | | | |
|---|---|---|---|---|---|---|---|
| | | | | a4 | a2 | a3 | a4 |
| Formulation of nitrile rubber composition | NBR (DN202H) | | | 100 | 100 | 100 | 100 |
| | Sulfur | | | 1 | 1 | 1 | 1 |
| | Zinc oxide | | | 5 | 5 | 5 | 5 |
| | Stearic acid | | | 1 | 1 | 1 | 1 |
| | NOCCELER ZTC | | | 1 | 1 | 1 | 1 |
| | NOCCELER TOT-N | | | 4 | 4 | 4 | 4 |
| | NOCCELER DM | | | 2 | 2 | 2 | 2 |
| | Silane coupling agent | | | — | — | — | — |
| Immersion treatment | Silane coupling agent | | | — | — | — | — |
| | Fluorine compound | Prep. Ex. 1 | Formula (1) | — | Run | — | — |
| | | Prep. Ex. 2 | Formula (2) | — | — | Run | — |
| | | Prep. Ex. 3 | Formula (3) | — | — | — | Run |
| | | Prep. Ex. 4 | Formula (1) | — | — | — | — |

TABLE 1-continued

| | | | | | | | |
|---|---|---|---|---|---|---|---|
| Existing amount of fluorine atom | Initial value [F/C] | | 0 | 0.90 | 0.99 | 0.62 |
| | Retention after solvent extraction [%] | Methanol | — | 16 | 14 | 13 |
| | | Ethanol | — | 13 | 13 | 14 |
| | | THF | — | 12 | 14 | 12 |
| | | Benzene | — | 12 | 12 | 12 |
| | | Toluene | — | 13 | 12 | 13 |
| | | Acetone | — | 12 | 12 | 12 |

TABLE 2

| | | | | Example | | | | Comp. Example | | | |
|---|---|---|---|---|---|---|---|---|---|---|---|
| | | | | B1 | B2 | B3 | B4 | b1 | b2 | b3 | b4 |
| Immersion treatment | Silane coupling agent | | | Run | Run | Run | — | — | — | — | — |
| | Fluorine compound | Prep. Ex. 1 | Formula (1) | Run | — | — | — | — | Run | — | — |
| | | Prep. Ex. 2 | Formula (2) | — | Run | — | — | — | — | Run | — |
| | | Prep. Ex. 3 | Formula (3) | — | — | Run | — | — | — | — | Run |
| | | Prep. Ex. 4 | Formula (1) | — | — | — | Run | — | — | — | — |
| Existing amount of fluorine atom | Initial value [F/C] | | | 0.97 | 1.02 | 0.65 | 1.01 | 0 | 0.89 | 0.97 | 0.63 |
| | Retention after solvent extraction [%] | Methanol | | 90≦ | 90≦ | 90≦ | 90≦ | — | 16 | 14 | 13 |
| | | Ethanol | | 90≦ | 90≦ | 90≦ | 90≦ | — | 13 | 13 | 14 |
| | | THF | | 90≦ | 90≦ | 90≦ | 90≦ | — | 12 | 14 | 12 |
| | | Benzene | | 90≦ | 90≦ | 90≦ | 90≦ | — | 12 | 12 | 12 |
| | | Toluene | | 90≦ | 90≦ | 90≦ | 90≦ | — | 13 | 12 | 13 |
| | | Acetone | | 90≦ | 90≦ | 90≦ | 90≦ | — | 12 | 12 | 12 |

TABLE 3

| | | | Example | | | | | | Comp. Example | | | |
|---|---|---|---|---|---|---|---|---|---|---|---|---|
| | | | C1 | C2 | C3 | C4 | C5 | C6 | c1 | c2 | c3 | c4 |
| Formulation of nitrile rubber composition | NBR (DN401) | | 100 | 100 | 100 | 100 | 100 | 100 | 100 | 100 | 100 | 100 |
| | Sulfur | | 1 | 1 | 1 | 1 | 1 | 1 | 1 | 1 | 1 | 1 |
| | Zinc oxide | | 5 | 5 | 5 | 5 | 5 | 5 | 5 | 5 | 5 | 5 |
| | NOCCELER ZTC | | 1 | 1 | 1 | 1 | 1 | 1 | 1 | 1 | 1 | 1 |
| | NOCCELER TOT-N | | 4 | 4 | 4 | 4 | 4 | 4 | 4 | 4 | 4 | 4 |
| | NOCCELER DM | | 2 | 2 | 2 | 2 | 2 | 2 | 2 | 2 | 2 | 2 |
| | Silane coupling agent | | 1 | 2 | 1 | 2 | 1 | 2 | — | — | — | — |
| Immersion treatment | Formula representing specific fluorine compound used in surface treatment | Formula (1) | Run | Run | — | — | — | — | — | Run | — | — |
| | | Formula (2) | — | — | Run | Run | — | — | — | — | Run | — |
| | | Formula (3) | — | — | — | — | Run | Run | — | — | — | Run |
| Existing amount of fluorine atom | Initial value [F/C] | | 0.90 | 0.94 | 1.02 | 1.06 | 0.58 | 0.59 | 0 | 0.44 | 0.43 | 0.22 |
| | Retention after solvent extraction [%] | Methanol | 90≦ | 90≦ | 90≦ | 90≦ | 90≦ | 90≦ | — | 11 | 7 | 7 |
| | | Ethanol | 90≦ | 90≦ | 90≦ | 90≦ | 90≦ | 90≦ | — | 16 | 9 | 9 |
| | | THF | 90≦ | 90≦ | 90≦ | 90≦ | 90≦ | 90≦ | — | 7 | 7 | 5 |
| | | Benzene | 90≦ | 90≦ | 90≦ | 90≦ | 90≦ | 90≦ | — | 4 | 5 | 5 |
| | | Toluene | 90≦ | 90≦ | 90≦ | 90≦ | 90≦ | 90≦ | — | 7 | 5 | 5 |
| | | Acetone | 90≦ | 90≦ | 90≦ | 90≦ | 90≦ | 90≦ | — | 11 | 7 | 5 |

TABLE 4

| | Ex. D1 | Ex. D2 | Ex. D3 | Ex. D4 | Ex. D5 | Ex. D6 | Comp. Ex. d1 | Ex. D7 |
|---|---|---|---|---|---|---|---|---|
| NBR (DN401) | 100 | 100 | 100 | 100 | 100 | 100 | 100 | 100 |
| Sulfur | 1 | 1 | 1 | 1 | 1 | 1 | 1 | 1 |
| Zinc oxide | 5 | 5 | 5 | 5 | 5 | 5 | 5 | 5 |
| NOCCELER ZTC | 1 | 1 | 1 | 1 | 1 | 1 | 1 | 1 |
| NOCCELER TOT-N | 4 | 4 | 4 | 4 | 4 | 4 | 4 | 4 |
| NOCCELER DM | 2 | 2 | 2 | 2 | 2 | 2 | 2 | 2 |

TABLE 4-continued

|  |  |  |  |  |  |  |  |  |  |
|---|---|---|---|---|---|---|---|---|---|
| Specific fluorine compound represented by formula (1) |  |  | 1 | 5 | 5 | 5 | 5 | 5 | 5 | 1 |
| Silane coupling agent |  |  | 1 | 1 | 2 | 3 | 4 | 5 | — | 1 |
| Silica |  |  | — | — | — | — | — | — | — | 20 |
| Existing amount of fluorine atom | Initial value [F/C] |  | 0.24 | 0.35 | 0.30 | 0.22 | 0.16 | 0.10 | 0.32 | 0.08 |
|  | Retention after solvent extraction [%] | Methanol | 90≦ | 90≦ | 90≦ | 90≦ | 90≦ | 90≦ | 6 | 90≦ |
|  |  | Ethanol | 90≦ | 90≦ | 90≦ | 90≦ | 90≦ | 90≦ | 3 | 90≦ |
|  |  | THF | 90≦ | 90≦ | 90≦ | 90≦ | 90≦ | 90≦ | 3 | 90≦ |
|  |  | Benzene | 90≦ | 90≦ | 90≦ | 90≦ | 90≦ | 90≦ | 6 | 90≦ |
|  |  | Toluene | 90≦ | 90≦ | 90≦ | 90≦ | 90≦ | 90≦ | 3 | 90≦ |
|  |  | Acetone | 90≦ | 90≦ | 90≦ | 90≦ | 90≦ | 90≦ | 3 | 90≦ |

|  |  |  | Ex. D8 | Ex. D9 | Ex. D10 | Ex. D11 | Ex. D12 | Comp. Ex. d2 | Comp. Ex. d3 |
|---|---|---|---|---|---|---|---|---|---|
| NBR (DN401) |  |  | 100 | 100 | 100 | 100 | 100 | 100 | 100 |
| Sulfur |  |  | 1 | 1 | 1 | 1 | 1 | 1 | 1 |
| Zinc oxide |  |  | 5 | 5 | 5 | 5 | 5 | 5 | 5 |
| NOCCELER ZTC |  |  | 1 | 1 | 1 | 1 | 1 | 1 | 1 |
| NOCCELER TOT-N |  |  | 4 | 4 | 4 | 4 | 4 | 4 | 4 |
| NOCCELER DM |  |  | 2 | 2 | 2 | 2 | 2 | 2 | 2 |
| Specific fluorine compound represented by formula (1) |  |  | 5 | 5 | 5 | 5 | 5 | 1 | 5 |
| Silane coupling agent |  |  | 1 | 2 | 3 | 4 | 5 | — | — |
| Silica |  |  | 20 | 20 | 20 | 20 | 20 | 20 | 20 |
| Existing amount of fluorine atom | Initial value [F/C] |  | 0.24 | 0.33 | 0.41 | 0.50 | 0.54 | 0.05 | 0.22 |
|  | Retention after solvent extraction [%] | Methanol | 90≦ | 90≦ | 90≦ | 90≦ | 90≦ | 40 | 41 |
|  |  | Ethanol | 90≦ | 90≦ | 90≦ | 90≦ | 90≦ | 40 | 41 |
|  |  | THF | 90≦ | 90≦ | 90≦ | 90≦ | 90≦ | 40 | 50 |
|  |  | Benzene | 90≦ | 90≦ | 90≦ | 90≦ | 90≦ | 40 | 45 |
|  |  | Toluene | 90≦ | 90≦ | 90≦ | 90≦ | 90≦ | 40 | 45 |
|  |  | Acetone | 90≦ | 90≦ | 90≦ | 90≦ | 90≦ | 40 | 41 |

EXAMPLE B5

One hundred parts of nitrile rubber "JSR N240S" (product of JSR Co., Ltd.) were mixed with 1.5 parts of an antioxidant "NOCRAC CD", 1.5 parts of stearic acid "Adeka Fatty Acid SA-300", 5 parts of zinc oxide, 70 parts of carbon black "THERMAX MT", 10 parts of calcium carbonate "HAKUENKA CC" (product of Shiraishi Kogyo Kaisha, Ltd.), 30 parts of dioctyl phthalate (DOP), 0.3 parts of sulfur, 1.5 parts of a crosslink-accelerating agent "NOCCELER TT" (product of Ouchi-Shinko Chemical Industrial Co., Ltd.) and 1.5 parts of a crosslink-accelerating agent "NOCCELER CZ-G" (product of Ouchi-Shinko Chemical Industrial Co., Ltd.) by 8-inch rolls, thereby obtaining uncrosslinked rubber composed of a nitrile rubber composition. This uncrosslinked rubber was then heat-treated at 150° C. for 20 minutes using a hot press, thereby producing a crosslinked rubber sheet (rubber base) composed of nitrile rubber.

After the crosslinked rubber sheet thus obtained was then immersed for 10 minutes in the treatment solution [hexane solution of the specific fluorine compound (5% by mass) and the silane coupling agent (1% by mass)] prepared in Preparation Example 5, the crosslinked rubber sheet was dried at room temperature to remove the solvent. The crosslinked rubber sheet, in which the specific fluorine compound and silane coupling agent had been caused to exist in the vicinity of the surface thereof in the above-described manner, was heat-treated for 10 minutes in a thermostatic chamber (150° C.) equipped with a ventilating function, thereby producing a crosslinked rubber sheet surface-treated with the specific fluorine compound represented by the formula (1).

EXAMPLE B6

One hundred parts of silicone rubber "SE6749U" (product of Dow Corning Toray Silicone Co., Ltd.) were mixed with 0.8 parts of 2,5-dimethyl-2,5-di(t-butyl peroxy)hexane 50% paste "RC-4 (50P)" (product of Dow Corning Toray Silicone Co., Ltd.) by 8-inch rolls, thereby obtaining uncrosslinked rubber composed of a nitrile rubber composition. This uncrosslinked rubber was then heat-treated at 170° C. for 10 minutes using a hot press and additionally at 200° C. for 4 hours, thereby producing a crosslinked rubber sheet (rubber base) composed of silicone rubber.

This crosslinked rubber sheet was subjected to immersion treatment, drying treatment and heating treatment in the same manner as in Example B5, thereby producing a crosslinked rubber sheet surface-treated with the specific fluorine compound represented by the formula (1).

<Evaluation (2) of Sheet>

With respect to the crosslinked rubber sheet (surface-treated nitrile rubber sheet) obtained in Example B5, a crosslinked rubber sheet (rubber base composed of nitrile rubber) subjected to no surface treatment, the crosslinked rubber sheet (surface-treated silicone rubber sheet) obtained in Example B6 and a crosslinked rubber sheet (rubber base composed of silicone rubber) subjected to no surface treatment, the adhesive strength and coefficient of dynamic friction were measured to evaluate them as to tack-free property and lubricity of their surfaces. The measurement was performed under environment of a temperature of 23° C. and a relative humidity of 40%. The measuring method is as follows. The results are shown in Table 5.

[Adhesive Strength]

Adhesive strength (90° peel strength) to a stainless steel plate was measured in accordance with JIS Z 0237.

More specifically, a test specimen (20 mm wide×180 mm long) composed of a crosslinked rubber sheet was superposed on the surface of a stainless steel plate washed with ethanol, and a roller having a diameter of 95 mm was reciprocated 3 times on the test specimen at a rate of about 300 mm/min so as to apply pressing force of about 10 N/cm wide to this superposed body, thereby bringing the test specimen into contact under pressure with the stainless steel plate. After the superposed body was left to stand for 20 minutes at room temperature, 90° peel strength was measured at a peel rate of 200 mm/min.

[Coefficient of Dynamic Friction]

Coefficient of dynamic friction against paper for copying was measured in accordance with ASTM D 1894. In this measurement, a specimen having a size of 25 mm×63 mm was used, the mass of a sliding piece was determined to be about 200 g, and the test was conducted at a rate of 150 mm/min.

TABLE 5

|  |  | Adhesive strength [N/cm] | Coefficient of dynamic friction |
|---|---|---|---|
| Example B5 | Crosslinked rubber sheet surface-treated | 0.018 | 0.49 |
|  | Rubber base (untreated article) | 0.14 | 0.76 |
| Example B6 | Crosslinked rubber sheet surface-treated | 0 | 0.40 |
|  | Rubber base (untreated article) | 0.038 | 1.06 |

It is understood from the results shown in Table 5 that the rubber articles surface-treated according to the method of the present invention have tack-free property and are excellent in surface lubricity.

Incidentally, such excellent surface properties were not lost even by washing treatment (Soxhlet extraction, extraction time=12 hours with each of the solvents shown in Tables 1 to 4) with various solvents

EFFECTS OF THE INVENTION

According to the methods for surface treatment of the present invention, the structure derived from the specific fluorine compound can be surely and efficiently joined to a polymer main chain of a rubber base. As a result, the surface-treated effect by this fluorine compound can be stably exhibited without being extinguished or destroyed even when brought into contact with various solvents.

In addition, the reactive organic functional group of the silane coupling agent is selected according to the kind of the rubber to be treated, whereby the same kind of compound may be used as the specific fluorine compound for various kinds of rubber.

According to the production processes of the present invention, the structure derived from the specific fluorine compound can be surely and efficiently joined to a polymer main chain of crosslinked rubber in the vicinity of the surface of a molding. As a result, rubber articles that can stably exhibit the surface-treated effect by the specific fluorine compound without being extinguished or destroyed even when brought into contact with various solvents can be produced with reliability.

In addition, the reactive organic functional group of the silane coupling agent is selected according to the kind of the raw rubber, whereby the same kind of compound may be used as the specific fluorine compound for various kinds of rubber.

According to the rubber compositions of the present invention, stable surface properties free from being extinguished or destroyed even when brought into contact with various solvents can be imparted to moldings of crosslinked rubber obtained by molding and processing such a rubber composition.

The rubber moldings according to the present invention can exhibit stable surface properties free from being extinguished or destroyed even when brought into contact with various solvents because the structure derived from the specific fluorine compound is surely and efficiently joined to a polymer main chain of crosslinked rubber through the silane coupling agent in the vicinity of at least the surface of the molding.

According to the processes for production of a rubber molding of the present invention, the structure derived from the specific fluorine compound can be surely and efficiently joined to a polymer main chain of crosslinked rubber in the vicinity of the surface of the resulting rubber molding. Such a rubber molding can exhibit stable surface properties free from being extinguished or destroyed even when brought into contact with various solvents.

In addition, the reactive organic functional group of the silane coupling agent is selected according to the kind of the raw rubber, whereby the same kind of compound may be used as the specific fluorine compound for various kinds of rubber.

The invention claimed is:

1. A method for surface treatment of rubber comprising the steps of causing a fluorine compound represented by the following formula (I) and a silane coupling agent to contact a surface of a rubber base comprising uncrosslinked rubber; and heat-treating the rubber base, formula (I):

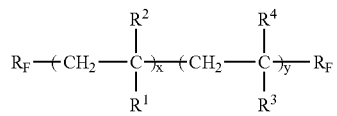

wherein $R_F$ is a fluoroalkyl-containing group represented by —$C_qF_{2q+1}$, wherein q is an integer of 1 to 10 or —$CF(CF_3)[OCF_2CF(CF_3)]_pOC_3F_7$, wherein p is 0, 1 or 2,
$R^1$ is a functional group having a reactivity to a hydrolyzable group selected from the group consisting of an alkoxysilyl group and an alkoxyalkoxysilyl group,
$R^2$ is a hydrogen atom or alkyl group,
$R^3$ and $R^4$ are the same or different from each other and are individually a hydrogen atom or a monovalent organic group selected from the group consisting of —$CH_3$, —COOH, —COO($CH_2$)$_2$OH, —CO—N($CH_3$)$_2$ and

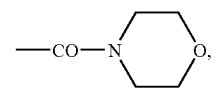

x is an integer of 1 to 100, and y is an integer of 0 to 500.

2. The method for surface treatment of rubber according to claim 1, wherein a solution of the silane coupling agent is coated on the surface of the rubber base comprising the uncrosslinked rubber, thereby causing the silane coupling agent to contact the surface of the rubber base, and a solution of the fluorine compound is coated on the surface of the rubber base, thereby causing the fluorine compound to contact the surface of the rubber base.

3. The method for surface treatment of rubber according to claim 1, wherein a mixed solution of the fluorine compound and the silane coupling agent is coated on the surface of the rubber base comprising the uncrosslinked rubber, thereby causing the fluorine compound and the silane coupling agent to contact the surface of the rubber base.

4. The method for surface treatment of rubber according to claim 1, wherein the rubber base comprising the uncrosslinked rubber is immersed in a solution of the silane coupling agent, thereby causing the silane coupling agent to contact the surface of the rubber base, and the rubber base is immersed in a solution of the fluorine compound, thereby causing the fluorine compound to contact the surface of the rubber base.

5. The method for surface treatment of rubber according to claim 1, wherein the rubber base comprising the uncrosslinked rubber is immersed in a mixed solution of the fluorine compound and the silane coupling agent, thereby causing the fluorine compound and the silane coupling agent to contact the surface of the rubber base.

6. The method for surface treatment of rubber according to claim 1, wherein the silane coupling agent is compounded into and mixed with the rubber, thereby causing the silane coupling agent to contact the surface of the rubber base comprising the uncrosslinked rubber, and a solution of the fluorine compound is coated on the surface of the rubber base, thereby causing the fluorine compound to contact the surface of the rubber base.

7. The method for surface treatment of rubber according to claim 1, wherein the silane coupling agent is compounded into and mixed with the rubber, thereby causing the silane coupling agent to contact the surface of the rubber base comprising the uncrosslinked rubber, and the rubber base is immersed in a solution of the fluorine compound, thereby causing the fluorine compound to contact the surface of the rubber base.

8. The method for surface treatment of rubber according to claim 1, wherein in the formula (I) representing the fluorine compound, the functional group represented by $R^1$ is an alkoxysilyl group.

9. The method for surface treatment of rubber according to claim 1, wherein in the formula (I) representing the fluorine compound, the functional group represented by $R^1$ is a trimethoxysilyl group.

10. The method for surface treatment of rubber according to claim 1, wherein in the formula (I) representing the fluorine compound, the fluoroalkyl-containing group represented by $R_F$ is selected from the group consisting of —$CF_3$, —$C_2F_5$, —$C_3F_7$, —$C_6F_{13}$, —$C_7F_{15}$ and —$CF(CF_3)$ $[OCF_2CF(CF_3)]_pOC_3F_7$, wherein p is 0, 1 or 2.

11. The method for surface treatment of rubber according to claim 1, wherein the fluorine compound is a compound represented by the following formula (1):

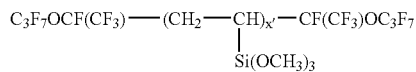

wherein x' is 2 or 3.

12. The method for surface treatment of rubber according to claim 1, wherein a reactive organic functional group of the silane coupling agent is a mercapto group or vinyl group.

13. A method for surface treatment of rubber comprising the steps of causing a fluorine compound represented by the following formula (I) and a silane coupling agent to contact a surface of a rubber base comprising crosslinked rubber; and heat-treating the rubber base, formula (I):

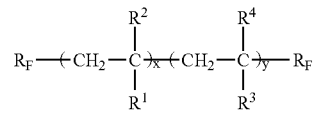

wherein $R_F$ is a fluoroalkyl-containing group represented by —$C_qF_{2q+1}$, wherein q is an integer of 1 to 10, or —$CF(CF_3)[OCF_2CF(CF_3)]_pOC_3F_7$, wherein p is 0, 1 or 2,
  $R^1$ is a functional group having a reactivity to a hydrolyzable group selected from the group consisting of an alkoxysilyl group and an alkoxyalkoxysilyl group,
  $R^2$ is a hydrogen atom or alkyl group,
  $R^3$ and $R^4$ are the same or different from each other and are individually a hydrogen atom or a monovalent organic group selected from the group consisting of —$CH_3$, —COOH, —COO(CH$_2$)$_2$OH, —CO—N(CH$_3$)$_2$

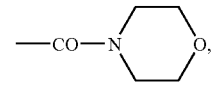

x is an integer of 1 to 100, and y is an integer of 0 to 500.

14. The method for surface treatment of rubber according to claim 13, wherein a solution of the silane coupling agent is coated on the surface of the rubber base comprising the crosslinked rubber, thereby causing the silane coupling agent to contact the surface of the rubber base, and a solution of the fluorine compound is coated on the surface of the rubber base, thereby causing the fluorine compound to contact the surface of the rubber base.

15. The method for surface treatment of rubber according to claim 13, wherein a mixed solution of the fluorine compound and the silane coupling agent is coated on the surface of the rubber base comprising the crosslinked rubber, thereby causing the fluorine compound and the silane coupling agent to contact the surface of the rubber base.

16. The method for surface treatment of rubber according to claim 13, wherein the rubber base comprising the crosslinked rubber is immersed in a solution of the silane coupling agent, thereby causing the silane coupling agent to contact the surface of the rubber base, and the rubber base is immersed in a solution of the fluorine compound, thereby causing the fluorine compound to contact the surface of the rubber base.

17. The method for surface treatment of rubber according to claim 13, wherein the rubber base comprising the crosslinked rubber is immersed in a mixed solution of the fluorine compound and the silane coupling agent, thereby causing the fluorine compound and the silane coupling agent to contact the surface of the rubber base.

18. The method for surface treatment of rubber according to claim 13, wherein in the formula (I) representing the fluorine compound, the functional group represented by $R^1$ is an alkoxysilyl group.

19. The method for surface treatment of rubber according to claim 13, wherein in the formula (I) representing the fluorine compound, the functional group represented by $R^1$ is a trimethoxysilyl group.

20. The method for surface treatment of rubber according to claim 13, wherein in the formula (I) representing the fluorine compound, the fluoroalkyl-containing group represented by $R_F$ is selected from the group consisting of —$CF_3$, —$C_2F_5$, —$C_3F_7$, —$C_6F_{13}$, —$C_7F_{15}$ and —$CF(CF_3)$[$OCF_2CF(CF_3)$]$_p OC_3F_7$, wherein p is 0, 1 or 2.

21. The method for surface treatment of rubber according to claim 13, wherein the fluorine compound is a compound represented by the following formula (1):

$$C_3F_7OCF(CF_3)\text{—}(CH_2\text{—}\underset{\underset{Si(OCH_3)_3}{|}}{CH})_{x'}\text{—}CF(CF_3)OC_3F_7$$

wherein x' is 2 or 3.

22. The method for surface treatment of rubber according to claim 13, wherein a reactive organic functional group of the silane coupling agent is a mercapto group or vinyl group.

23. A process for production of a rubber article, comprising the steps of:
molding and processing a rubber composition obtained by compounding and mixing 0.5 to 5 parts by mass of a silane coupling agent with 100 parts by mass of raw rubber, thereby obtaining a molding comprising crosslinked rubber,
causing a fluorine compound represented by the following formula (I) to adhere to a surface of the molding, and
heat-treating the molding, to the surface of which the fluorine compound has been caused to adhere, formula (I):

$$R_F\text{—}(CH_2\text{—}\underset{\underset{R^1}{|}}{\overset{\overset{R^2}{|}}{C}})_x\text{—}(CH_2\text{—}\underset{\underset{R^3}{|}}{\overset{\overset{R^4}{|}}{C}})_y\text{—}R_F$$

wherein $R_F$ is a fluoroalkyl-containing group represented by —$C_qF_{2q+1}$, wherein q is an integer of 1 to 10, or
—$CF(CF_3)$[$OCF_2CF(CF_3)$]$_p OC_3F_7$, wherein p is 0, 1 or 2,
$R^1$ is a functional group having a reactivity to a hydrolyzable group selected from the group consisting of an alkoxysilyl group and alkoxyalkoxysilyl group,
$R^2$ is a hydrogen atom or alkyl group,
$R^3$ and $R^4$ are the same or different from each other and are individually a hydrogen atom or a monovalent organic group selected from the group consisting of —$CH_3$, —COOH, —COO($CH_2$)$_2$OH, —CO—N($CH_3$)$_2$ and

—CO—N⟨⟩O, x is an integer of 1 to 100, and y is an integer of 0 to 500.

24. The process for production of the rubber article according to claim 23, wherein a solution of the fluorine compound is coated on the surface of the molding, thereby causing the fluorine compound to adhere to the surface of the molding.

25. The process for production of the rubber article according to claim 23, wherein the molding is immersed in a solution of the fluorine compound, thereby causing the fluorine compound to adhere to the surface of the molding.

26. The process for production of the rubber article according to claim 23, wherein in the formula (I) representing the fluorine compound, the functional group represented by $R^1$ is an alkoxysilyl group.

27. The process for production of the rubber article according to claim 23, wherein in the formula (I) representing the fluorine compound, the functional group represented by $R^1$ is a trimethoxysilyl group.

28. The process for production of the rubber article according to claim 23, wherein in the formula (I) representing the fluorine compound, the fluoroalkyl-containing group selected from the group consisting of $R_F$ is represented by —$CF_3$, —$C_2F_5$, —$C_3F_7$, —$C_6F_{13}$, —$C_7F_{15}$ and —$CF(CF_3)$[$OCF_2CF(CF_3)$]$_p OC_3F_7$, wherein p is 0, 1 or 2.

29. The process for production of the rubber article according to claim 23, wherein the fluorine compound is a compound represented by the following formula (1):

$$C_3F_7OCF(CF_3)\text{—}(CH_2\text{—}\underset{\underset{Si(OCH_3)_3}{|}}{CH})_{x'}\text{—}CF(CF_3)OC_3F_7$$

wherein x' is 2 or 3.

30. The process for production of the rubber article according to claim 23, wherein a reactive organic functional group of the silane coupling agent is a mercapto group or vinyl group.

31. A rubber composition comprising (a) raw rubber, (b) a crosslinking agent selected from the group consisting of sulfur, sulfur chloride, an organic sulfur-containing compound, an organic peroxide, a metal oxide, quinone dioxime, an organic polyvalent amine and a modified phenol resin, (c) a fluorine compound represented by the following formula (I) and a silane coupling agent, formula (I):

$$R_F\text{—}(CH_2\text{—}\underset{\underset{R^1}{|}}{\overset{\overset{R^2}{|}}{C}})_x\text{—}(CH_2\text{—}\underset{\underset{R^3}{|}}{\overset{\overset{R^4}{|}}{C}})_y\text{—}R_F$$

wherein $R_F$ is a fluoroalkyl-containing group represented by —$C_qF_{2q+1}$, wherein q is an integer of 1 to 10, or
—$CF(CF_3)OCF_2CF(CF_3)$]$_p OC_3F_7$, wherein p is 0, 1 or 2,
$R^1$ is a functional group having a reactivity to a hydrolyzable group represented by a formula —$Si(OR^{11})_3$, wherein $R^{11}$ is an alkyl group or alkoxyalkyl group,
$R^2$ is a hydrogen atom or alkyl group,
$R^3$ and $R^4$ are the same or different from each other and are individually a hydrogen atom or a monovalent organic group selected from the group consisting of —$CH_3$, —COOH, —COO($CH_2$)$_2$OH, —CO—N($CH_3$)$_2$ and

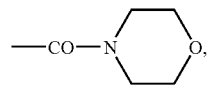

x is an integer of 1 to 100 and y is an integer of 0 to 500.

32. The rubber composition according to claim 31, wherein the functional group represented by $R^1$ in the formula (I) is a group represented by a formula —Si(OR$^{11}$)$_3$, wherein $R^{11}$ is an alkyl group.

33. A rubber composition comprising (a) raw rubber, (b) a crosslinking agent selected from the group consisting of sulfur, sulfur chloride, an organic sulfur-containing compound, an organic peroxide, a metal oxide, quinone dioxime, an organic polyvalent amine and a modified phenol resin, (c) a fluorine compound represented by the following formula (1) and (d) a silane coupling agent, formula (1):

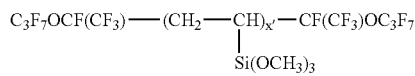

wherein x' is 2 or 3.

34. The rubber composition according to claim 33, wherein 1 to 10 parts by mass of the fluorine compound and 1 to 5 parts by mass of the silane coupling agent are contained in 100 parts by mass of the raw rubber.

35. The rubber composition according to claim 33, wherein 1 to 5 parts by mass of the fluorine compound and 1 to 3 parts by mass of the silane coupling agent are contained in 100 parts by mass of the raw rubber.

36. A rubber composition comprising (a) raw rubber, (b) a crosslinking agent selected from the group consisting of sulfur, sulfur chloride, an organic sulfur-containing compound, an organic peroxide, a metal oxide, quinone dioxime, an organic polyvalent amine and a modified phenol resin, (c) a fluorine compound, (d) a silane coupling agent and (e) silica, wherein said fluorine compound is of the following formula (I):

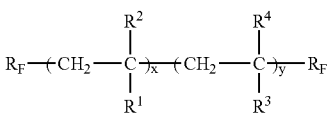

wherein $R_F$ is a fluoroalkyl-containing group represented by —$C_qF_{2q+1}$, wherein q is an integer of 1 to 10, or —CF(CF$_3$)[OCF$_2$CF(CF$_3$)]$_p$OC$_3$F$_7$, wherein p is 0, 1 or 2, $R^1$ is a functional group having a reactivity to a hydrolyzable group represented by a formula —Si(OR$^{11}$)$_3$, wherein $R^{11}$ is an alkyl group or alkoxyalkyl group, $R^2$ is a hydrogen atom or alkyl group, $R^3$ and $R^4$ are the same or different from each other and are individually a hydrogen atom or a monovalent organic group selected from the group consisting of —CH$_3$, —COOH, —COO(CH$_2$)$_2$OH, —CO—N(CH$_3$)$_2$ and

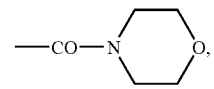

x is an integer of 1 to 100 and y is an integer of 0 to 500.

37. A rubber composition comprising (a) raw rubber, (b) a crosslinking agent selected from the group consisting of sulfur, sulfur chloride, an organic sulfur-containing compound, an organic peroxide, a metal oxide, quinone dioxime, an organic polyvalent amine and a modified phenol resin, (c) a fluorine compound, (d) a silane coupling agent and (e) silica, wherein said fluorine compound is of the following formula (I):

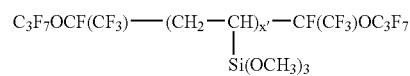

wherein x' is 2 or 3.

38. The rubber composition according to claim 37, wherein 1 to 10 parts by mass of the fluorine compound, 1 to 10 parts by mass of the silane coupling agent and 5 to 50 parts by mass of the silica are contained in 100 parts by mass of the raw rubber.

39. The rubber composition according to claim 37, wherein 1 to 5 parts by mass of the fluorine compound, 1 to 5 parts by mass of the silane coupling agent and 10 to 30 parts by mass of the silica are contained in 100 parts bymass of the raw rubber.

40. A rubber article obtained in accordance with the process according to any one of claims 23 to 30.

41. A rubber molding obtained by molding and processing the rubber composition according to any one of claims 31 to 39.

42. A process for production of a rubber molding, comprising the step of molding and processing the rubber composition according to any one of claims 31 to 39.

* * * * *